(12) United States Patent
Kim et al.

(10) Patent No.: US 12,299,198 B2
(45) Date of Patent: May 13, 2025

(54) PROTRUSION-BASED SMART TABLET

(71) Applicant: DOT INCORPORATION, Seoul (KR)

(72) Inventors: Ju Yoon Kim, Gimpo-si (KR); Ji Ho Kim, Gimpo-si (KR); Hyeon Cheol Park, Gwangmyeong-si (KR)

(73) Assignee: DOT INCORPORATION, Seoul (KR)

( * ) Notice: Subject to any disclaimer, the term of this patent is extended or adjusted under 35 U.S.C. 154(b) by 0 days.

(21) Appl. No.: 18/018,773

(22) PCT Filed: Jun. 21, 2021

(86) PCT No.: PCT/KR2021/007764
§ 371 (c)(1),
(2) Date: Jan. 30, 2023

(87) PCT Pub. No.: WO2022/025433
PCT Pub. Date: Feb. 3, 2022

(65) Prior Publication Data
US 2024/0264673 A1 Aug. 8, 2024

(30) Foreign Application Priority Data
Jul. 31, 2020 (KR) .................. 10-2020-0096384

(51) Int. Cl.
*G06F 3/01* (2006.01)
(52) U.S. Cl.
CPC .................. *G06F 3/016* (2013.01)
(58) Field of Classification Search
CPC ...................................... G06F 3/016
See application file for complete search history.

(56) References Cited

FOREIGN PATENT DOCUMENTS

| JP | 2006-246108 A | 9/2006 |
|---|---|---|
| JP | 2009-31469 A | 2/2009 |
| KR | 10-2012-0065779 A | 6/2012 |
| KR | 10-2014-0008823 A | 1/2014 |
| KR | 10-1413277 B1 | 7/2014 |
| KR | 10-2014-0104305 A | 8/2014 |
| KR | 10-2017-0058254 A | 5/2017 |
| KR | 10-2017-0119970 A | 10/2017 |
| KR | 10-2017-0128196 A | 11/2017 |

OTHER PUBLICATIONS

Nishi JP 2009-031469 A machine translation (Year: 2024).*
Shin et al. KR 20140008823 A machine translation (Year: 2024).*
International Search Report for PCT/KR2021/007764 dated, Sep. 28, 2021 (PCT/ISA/210).

* cited by examiner

*Primary Examiner* — Gustavo Polo
(74) *Attorney, Agent, or Firm* — Sughrue Mion, PLLC

(57) ABSTRACT

Provided is a protruding-based smart tablet including an expression area sensed by a user, the protruding-based smart tablet including a plurality of expression units formed to perform a protruding movement so that the user senses the protruding, a movement control unit configured to control the movement of the expression units, an information control unit configured to control the movement control unit to transmit one or more pieces of information through the expression units, a sensing unit configured to sense an object on the expression area, and an operation control unit configured to control an operation of the expression unit according to a sensing result by the sensing unit.

5 Claims, 34 Drawing Sheets

PROTRUSION-BASED SMART TABLET

CROSS REFERENCE TO RELATED APPLICATIONS

This application is a National Stage of International Application No. PCT/KR2021/007764 filed Jun. 21, 2021, claiming priority based on Korean Patent Application No. 10-2020-0096384, filed on Jul. 31, 2020, in the Korean Intellectual Property Office, the disclosure of which is incorporated by reference herein in its entirety.

BACKGROUND

1. Field

Embodiments of the present disclosure relate to a protruding-based smart tablet.

2. Description of the Related Art

Users may recognize information in various ways. For this purpose, various types of information output devices are being used.

For example, a device for outputting visual information using printed materials, a device for outputting audio information through sound, and the like are being used.

In particular, according to an increase in an amount of information and development of technology, information output devices using electronic technologies are widely used nowadays, and a display device having a plurality of pixels is frequently used as a visual information output device.

However, in the case of such a display device, various circuits are built in, and thus manufacturing is not easy and control is inconvenient.

Meanwhile, various forms of information output are required due to technological development and diversification of lifestyle.

As an example, various information output devices may be required according to a situation of each user, and in particular, when a user has a certain weakened sense, for example, when the user is visually impaired, it is necessary to output information through a tactile sense. When information is output through tactile sense, it is difficult to easily control and stably drive the same, and thus, there is a limitation in improving user's convenience through an improvement in information output devices.

SUMMARY

Embodiments of the present disclosure provide a protruding-based smart tablet capable of precisely controlling the output of information and improving user convenience.

Additional aspects will be set forth in part in the description which follows and, in part, will be apparent from the description, or may be learned by practice of the presented embodiments of the disclosure.

According to an aspect of the present disclosure, there is provided a protruding-based smart tablet including an expression area sensed by a user, the protruding-based smart tablet including a plurality of expression units formed to perform a protruding movement so that the user senses the protruding, a movement control unit configured to control the movement of the expression units, an information control unit configured to control the movement control unit to transmit one or more pieces of information through the expression units, a sensing unit configured to sense an object on the expression area, and an operation control unit configured to control an operation of the expression unit according to a sensing result by the sensing unit.

In the present embodiment, the sensing unit may include a plurality of sensing members arranged to be spaced apart from each other.

In the present embodiment, the expression unit may move by a magnetic field.

According to another aspect of the present disclosure, there is provided a protruding-based smart tablet including an expression area sensed by a user, the protruding-based smart tablet including a sensing unit configured to sense a user manipulation area on the expression area, an information generation control unit configured to generate expression information by identifying the user manipulation area sensed by the sensing unit, a movement control unit configured to control a moving force according to the information generated by the information generation control unit, and a plurality of expression units formed to perform a protruding movement by the moving force provided by the movement control unit so that the user senses the protruding, and configured to express the expression information.

In the present embodiment, the expression information may include a manipulation path of the user.

Other aspects, features, and advantages other than the above-described features will be apparent from the following drawings, claims, and detailed descriptions of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
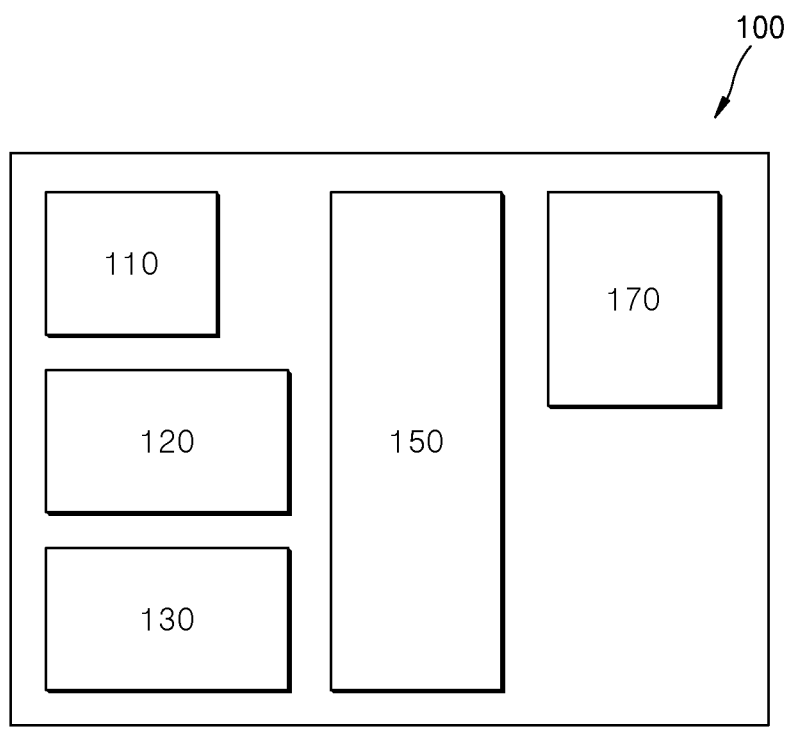
FIG. 1 is a diagram for schematically describing a protruding-based smart tablet according to an embodiment of the present disclosure.

While the present disclosure is susceptible to various modifications and may include various embodiments, specific embodiments thereof are shown by way of example in the drawings and will herein be described in detail. Advantages and features of the present disclosure and methods for accomplishing the same will be more clearly understood from embodiments described below in detail with reference to the drawings. However, the present disclosure is not limited to the embodiments disclosed below but may be implemented in various forms.

Hereinafter, the embodiments of the present disclosure will be described below in detail with reference to the accompanying drawings, but when describing with reference to the drawings, equal or corresponding components will be referred to as the same reference numerals, and redundant descriptions thereof will be omitted.

In the following embodiments, the terms "first," "second," and the like have been used to distinguish one component from another, rather than limitative in all aspects.

In the following embodiments, singular forms are intended to include plural forms as well, unless the context clearly indicates otherwise.

In the following embodiments, the terms such as "including," "having," and "comprising" are intended to indicate the existence of features or components disclosed in the specification, and are not intended to preclude the possibility that one or more other features or components may be added.

For convenience of description, sizes of components shown in the drawings may be exaggerated or reduced. For example, since the size and thickness of each component illustrated in the drawing are arbitrarily shown for convenience of description, the present disclosure is not necessarily limited to those illustrated in the drawing.

In the following embodiments, an x-axis, a y-axis, and a z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process sequence may be performed differently from the described order. For example, two consecutively described processes may be performed substantially at the same time or performed in an order opposite to the described order.

FIG. 1 is a diagram for schematically describing a protruding-based smart tablet according to an embodiment of the present disclosure.

Protruding-Based Smart Tablet

Referring to FIG. 1, a protruding-based smart tablet (hereinafter, referred to as a "smart tablet") 100 of the present embodiment relates to a protruding-based smart tablet including an expression area sensed by a user, and may include an expression unit 110, a movement control unit 120, an information control unit 130, a sensing unit 150, and an operation control unit 170.

The expression unit 110 may be provided in plural, each of which is formed to perform a protruding movement so that a user senses the protrusion.

The smart tablet 100 may include an expression area through which information that can be sensed by the user is expressed, and the plurality of expression units 110 may be disposed in the expression area.

The expression unit 110 may move to protrude so that the user senses the protruding through a tactile sense. According to an optional embodiment, the user may also sense the protruding through a visual sense.

The movement control unit 120 may control the movement of the expression unit 110 so that the expression unit 110 protrudes.

For example, the movement control unit 120 may move in one direction (for example, upward) in which the expression unit 110 protrudes, and may move in a direction opposite thereto.

As a specific example, the movement control unit 120 may linearly move along one direction (for example, upward) in which the expression unit 110 protrudes.

In addition, as another example, the movement control unit 120 may perform an angular movement or a rotational movement, and accordingly, the expression unit 110 connected to the movement control unit 120 may be moved to protrude.

According to an optional embodiment, the movement control unit 120 may include a driving-providing area, from which a driving force is provided, and a movement area, which is connected to the driving-providing area and to which the driving force is provided. In the movement area, the movement control unit 120 may linearly or angularly move by the driving force, and the expression unit 110 may move by the movement of the movement control unit 120.

The movement control unit 120 may be formed to control the movement of the expression unit 110, for example, when the expression unit 110 is provided in plural, the movement control unit 120 may be provided in plural to respectively correspond to the plurality of expression units 110.

The information control unit 130 may control the movement control unit 120 to transmit one or more pieces of information through the expression unit 110.

As an example, the information control unit 130 may generate an information area in the form of braille that can be sensed by a user. In addition, as another example, the information control unit 130 may generate various forms of information areas that can be sensed by the user tactilely or visually in addition to the braille. In addition, the movement control unit 120 may control the expression unit 110 corresponding to the information area to protrude.

As a result, as one or more expression units 110 corresponding to the information area generated by the information control unit 130 protrude, a user may recognize information, as a specific example, braille information provided through the information area by sensing, for example, by tactilely sensing the protruding expression unit 110.

According to an optional embodiment, the information control unit 130 may control the movement control unit 120 using information in a storage unit (not shown) provided in the smart tablet 100, and as another example, the information control unit 130 may control the movement control unit 120 by receiving the information via wired or wireless communication with an external device or the like.

The sensing unit 150 may be formed to sense an object on the expression area.

For example, whether a user's hand is present on the expression area may be sensed and, as a specific example, the position of the user's hand may be sensed.

According to an optional embodiment, whether a user's finger is placed to correspond to at least one of the plurality of expression units 110 in the expression area of the smart tablet 100 may be sensed.

As an example, when a user senses one or more pieces of information by sensing a protruding shape of the expression units 110 in the smart tablet 100 or senses information in the form of braille, the user may obtain the information by moving the finger on the plurality of expression units 110 while contacting the finger on the plurality of expression units 110.

In this case, even when the information expression is suspended or during a pause period for the information expression, the user may hold the finger being placed to correspond to the expression units 110. In addition, in such a case, since the user places the finger on the expression units 110, it may not be easy for the expression units 110 to protrude.

The sensing unit 150 may confirm that it is not easy for the expression unit 110 at the position corresponding to the user's hand to protrude, by sensing the position of the user's finger. As will be described below, the sensing unit 150 may perform controls such as stopping the information expression through the expression unit 110, notifying the user to move his/her hand, or moving the protruding area of the expression unit 110. The sensing unit 150 may include various types of devices.

As an example, the sensing unit 150 may use an optical member, e.g., a laser sensor. As a specific example, the sensing unit 150 may include a plurality of laser sensors arranged in one direction.

A position of the user's finger in one direction (e.g., an X-direction) may be identified by checking which one of the plurality of laser sensors arranged in the one direction (e.g., the X-direction) senses the user's finger, and a position of the user's finger in a direction (e.g., a Y-direction) crossing the one direction may be identified by sensing a distance between each laser sensor and the user's finger.

As a result, the position where the user's finger is placed may be sensed, and furthermore, the position of the expression unit 110 blocked by corresponding to the finger may be identified.

According to an optional embodiment, the sensing unit 150 may include various types of optical sensors.

In addition, according to another optional embodiment, the sensing unit 150 may include a position sensing member using another method, other than an optical sensor.

The operation control unit 170 may control operations of the expression unit 110 according to the result sensed by the sensing unit 150.

For example, when it is determined that an object, for example, the user's finger is placed on the expression unit 110 and thus the operation of the expression unit 110 is restricted as a result of sensing by the sensing unit 150, the operation control unit 170 may control the operation of the expression unit 110 so that, for example, the operation is prevented from starting.

According to an optional embodiment, the operation of the expression unit 110 may be controlled when the area of the expression unit 110, on which the user's finger is placed, corresponds to the information area generated by the information control unit 130.

Figure 2:
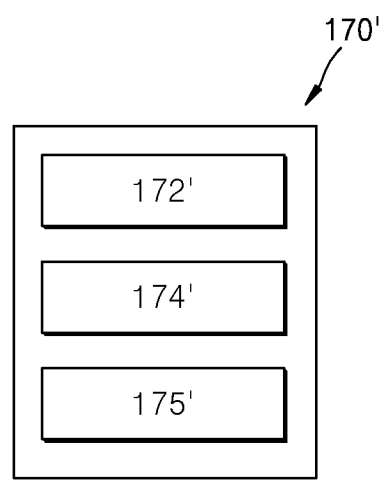
FIG. 2 is a diagram illustrating an optional embodiment of an operation control unit of FIG. 1.

FIG. 2 is a diagram illustrating an optional embodiment of the operation control unit of FIG. 1.

Referring to FIG. 2, an operation control unit 170' may include an operation-stop control unit 172', an operation change control unit 174', or a notification control unit 175'.

In FIG. 2, the operation control unit 170' is illustrated as including all of the operation-stop control unit 172', the operation change control unit 174', and the notification control unit 175', but this is for convenience of description, and the operation control unit 170' may include one or more among the operation-stop control unit 172', the operation change control unit 174', and the notification control unit 175'.

The operation-stop control unit 172' may control the expression unit 110 to stop the operation. For example, when a user's hand is located to correspond to the expression unit 110 included in the information area generated by the information control unit 130, the operation of the expression unit 110 corresponding to the information area may be stopped.

The operation change control unit 174' may control the expression unit 110 to change the operation. For example, when a user's finger is located to correspond to the expression unit 110 included in the information area generated by the information control unit 130, the position of the information area may be changed and the expression unit 110 therein may protrude. For example, only the position of the information area may be changed while leaving the shape of the information area unchanged, and accordingly, the position of the information area may be changed to correspond to the expression units 110 on which the user's finger is not located.

Accordingly, the expression units 110 may protrude so that the information area can be expressed at a position shifted by a set distance from the expression units 110, which are blocked by the user's finger and thus are restricted in operation such as protruding.

As a specific example, as the expression units 110 protrude while the shape of the information area is not changed and only the position thereof is changed, the user may obtain information as it is through the information area.

The notification control unit 175' may notify the user that an operation is restricted due to the presence of an object in the information area. For example, when the user's finger is located to correspond to the expression unit 110 included in the information area generated by the information control unit 130, the fact that the information area can be displayed normally may be notified to the user through sound, and as another example, a message informing the user to change the position of the finger since the user's finger is placed in the position of the information area may be generated in a voice form. To this end, the notification control unit 175' may include an audio signal generation control unit.

According to an optional embodiment, the notification control unit 175' may include a vibration generating unit and transmit a vibration signal to a user.

Figure 3:
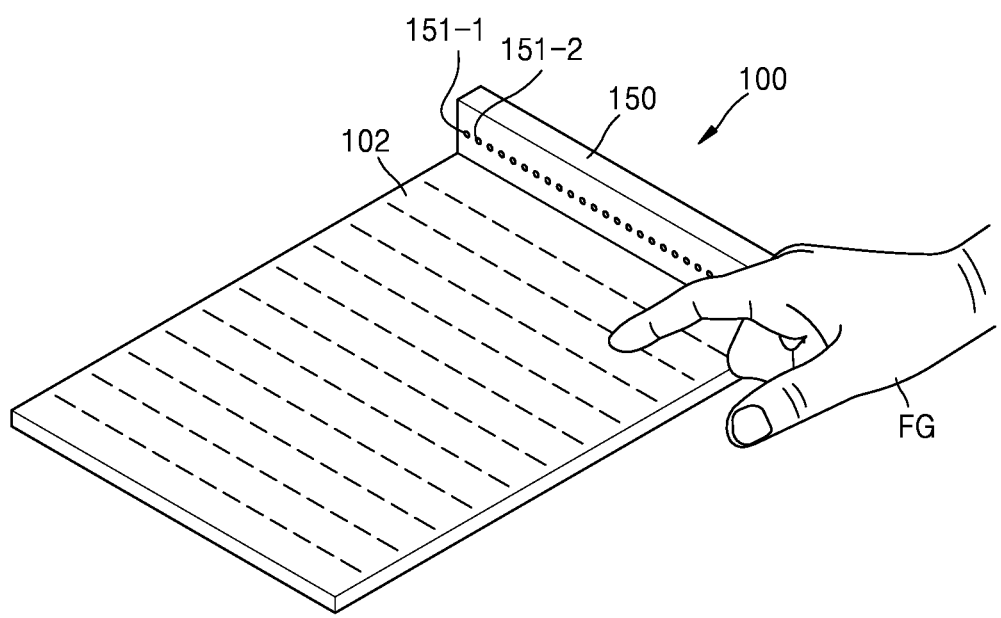
FIGS. 3 and 4 are exemplary diagrams of the protruding-based smart tablet of FIG. 1.
Figure 4:
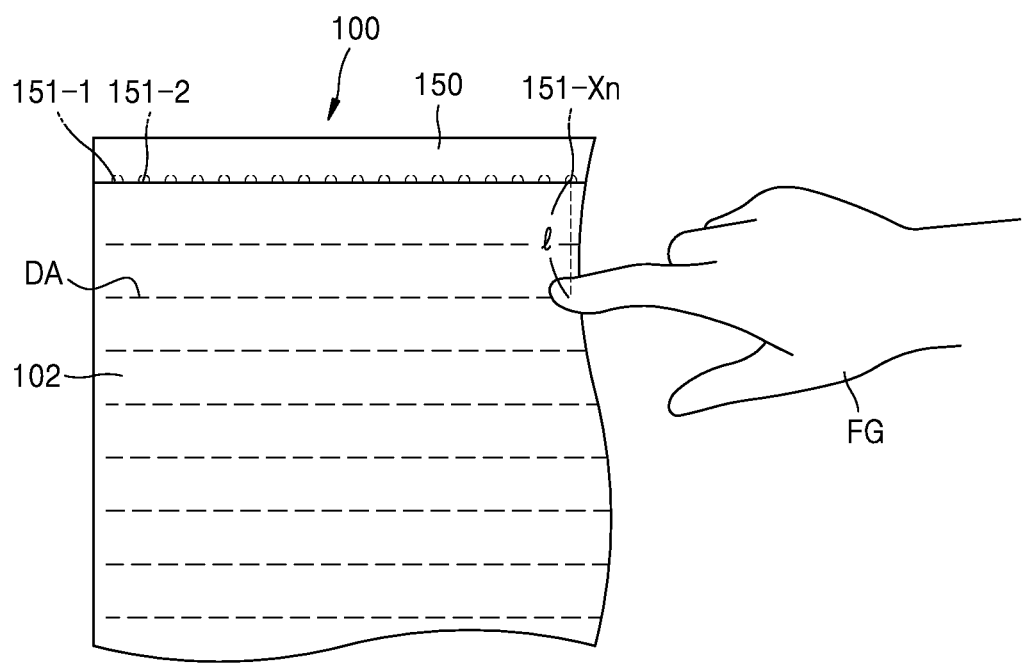

FIGS. 3 and 4 are exemplary diagrams of the protruding-based smart tablet of FIG. 1.

Referring to FIGS. 3 and 4, the smart tablet 100 may include an expression area DA and the sensing unit 150.

The expression area DA may include an area in which a plurality of expression units (not shown) are arranged, for example, may include an area in which a plurality of expression units (not shown) arranged to be spaced apart from each other in one direction (X-axis direction) and a plurality of expression units (not shown) arranged to be spaced apart from each other in one direction (Y-axis direction) crossing the X-axis direction.

Information may be transmitted to a user through a protruding shape of the expression units arranged in the expression area DA, and for example, the expression units of the expression area DA may protrude to correspond to a shape of the information area generated by the information control unit as described above, and the user may sense the protrusions tactilely through a finger FG.

According to an optional embodiment, the smart tablet 100 includes a cover unit 102, and the expression area DA may be located on one surface of the cover unit 102. In addition, a plurality of holes (not shown) may be formed in the cover unit 102, and the plurality of expression units may move to protrude respectively through the holes (not shown). A detailed description thereof will be provided below.

The sensing unit 150 may be disposed to be connected to one surface of the cover unit 102 and may be coupled thereto. In addition, according to an optional embodiment, the sensing unit 150 may be formed to be separated from the cover unit 102, and may be mounted on the cover unit 102.

The sensing unit 150 may include a plurality of position confirming members 151-1 and 151-2. For example, each of the plurality of position confirming members 151-1 and 151-2 may be an optical member, and may include a laser sensor.

In addition, an appropriate number of position confirming members 151-1 and 151-2 may be arranged to correspond to the entire width of the expression area DA in one direction.

As an example, based on the user at the time using the smart tablet 100, the sensing unit 150 may be disposed on an upper portion of the cover unit 102, and the plurality of position confirming members 151-1 and 151-2 may be arranged in a transverse direction.

Accordingly, each of the plurality of position confirming members 151-1 and 151-2 may operate to confirm the position of the finger FG of the user in the transverse direction in the expression area DA.

In addition, as shown in FIG. 4, the position of the finger FG of the user in a longitudinal direction may be confirmed through a position confirming member 151-Xn corresponding to the finger FG of the user.

For example, the position confirming member 151-xn may identify a distance I to the finger FG and as a specific example, the position confirming member 151-xn may easily confirm the distance I to the finger FG by include a laser sensor and using laser incidence and reflection.

As a result, when the finger FG is located in the expression area DA, the position of the finger FG may be easily identified, and through this, the position of the expression unit, whose operation is limited since the finger FG corresponds thereto, may be confirmed.

Figure 5:
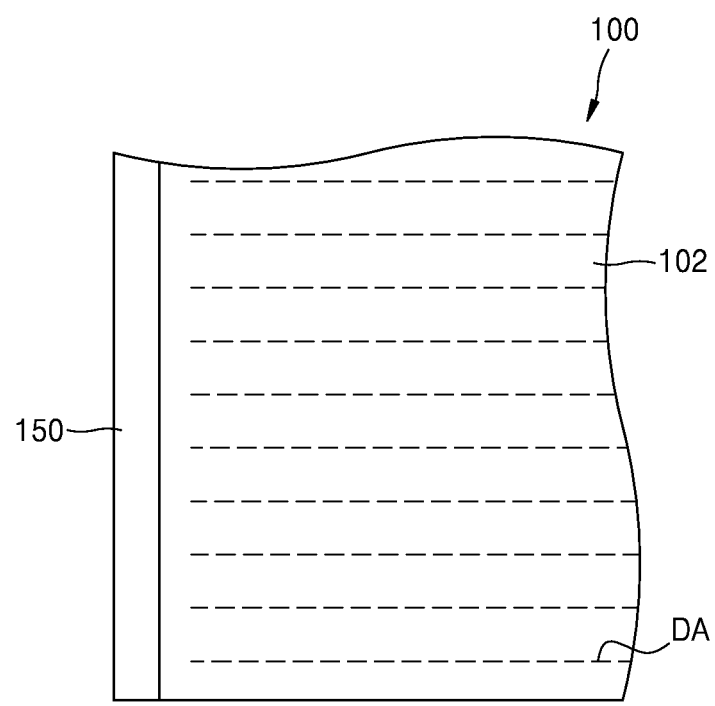
FIG. 5 is another exemplary diagram of the protruding-based smart tablet of FIG. 1.

FIG. 5 is another exemplary diagram of the protruding-based smart tablet of FIG. 1.

Referring to FIG. 5, based on the user at the time using the smart tablet 100, the sensing unit 150 may be disposed on a side surface of the cover unit 102, for example, on a left side of the cover unit 102, and the plurality of position confirming members may be arranged in the longitudinal direction.

Accordingly, each of the plurality of position confirming members of the sensing unit 150 may operate to confirm the position of the finger FG of the user in the longitudinal direction in the expression area DA.

In addition, the position of the finger FG of the user in the transverse direction may be confirmed through the position confirming member corresponding to the finger FG of the user.

Figure 6:
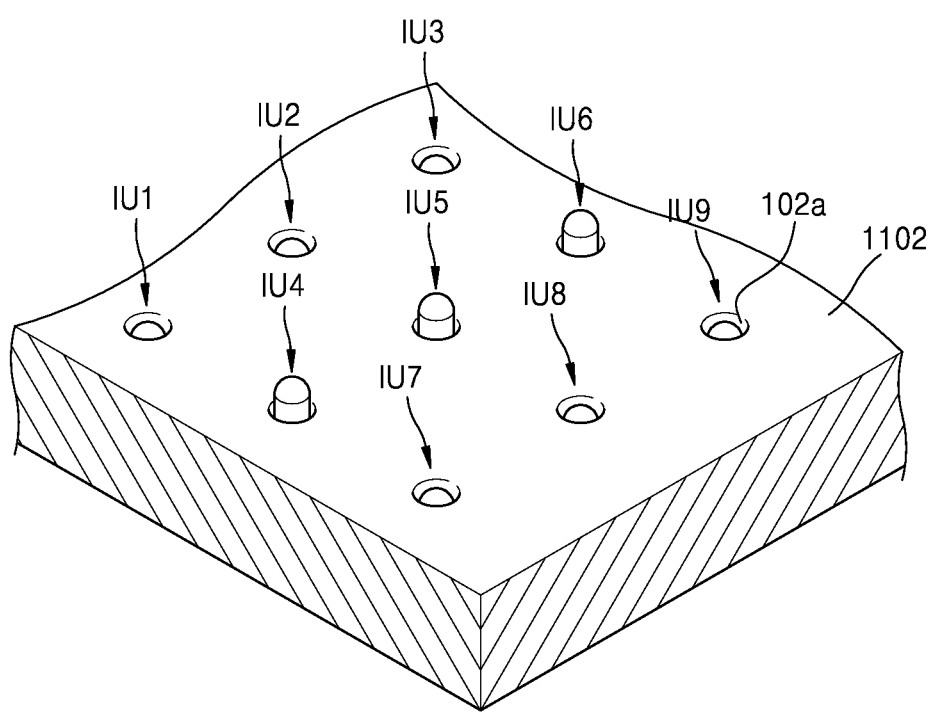
FIG. 6 is a schematic enlarged diagram of one area of FIG. 3.

FIG. 6 is a schematic enlarged diagram of one area of FIG. 3.

FIG. 6 may be an example illustrating one area of the expression area DA of the smart tablet 100.

As shown in FIG. 6, a plurality of holes 102*a* may be formed in the cover unit 102, and a plurality of units IU1 to IU9 may be arranged to respectively correspond to the plurality of holes 102*a*. Each of the plurality of units IU1 to IU9 may include an expression unit that moves to protrude. Specific details thereof are described later.

Figure 7:
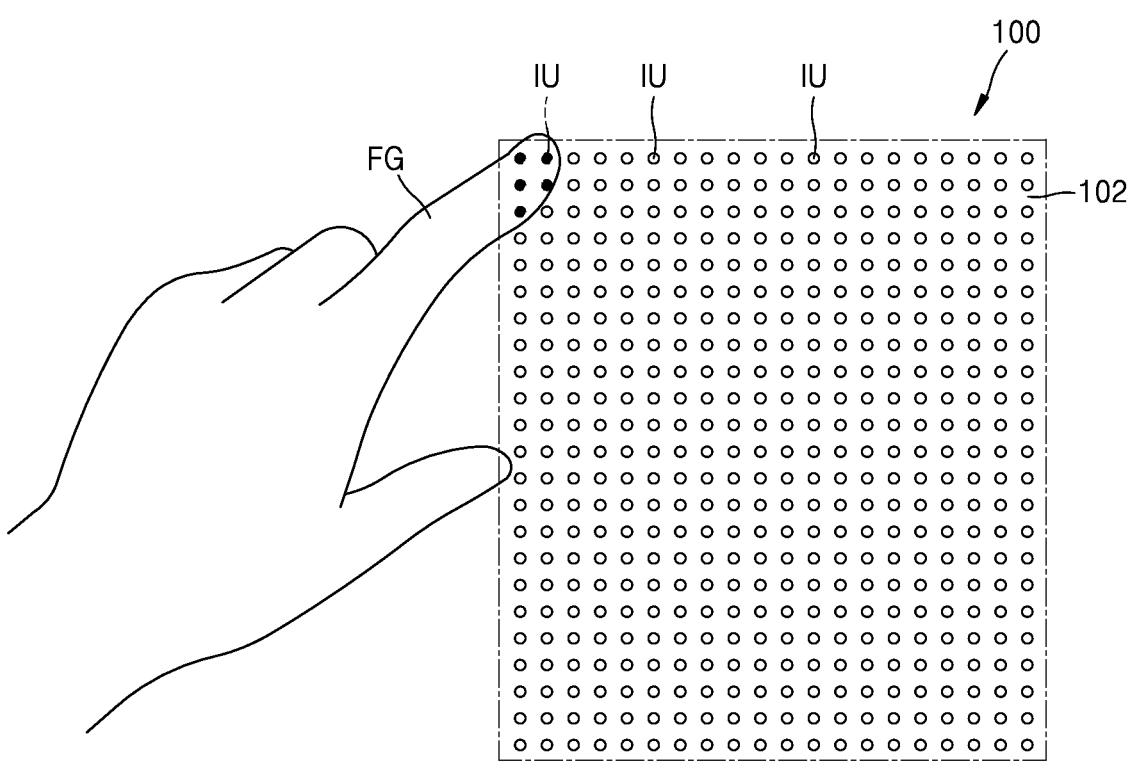
FIGS. 7 to 9 are diagrams for schematically describing an example of an operation of the protruding-based smart tablet according to an embodiment of the present disclosure.
Figure 8:
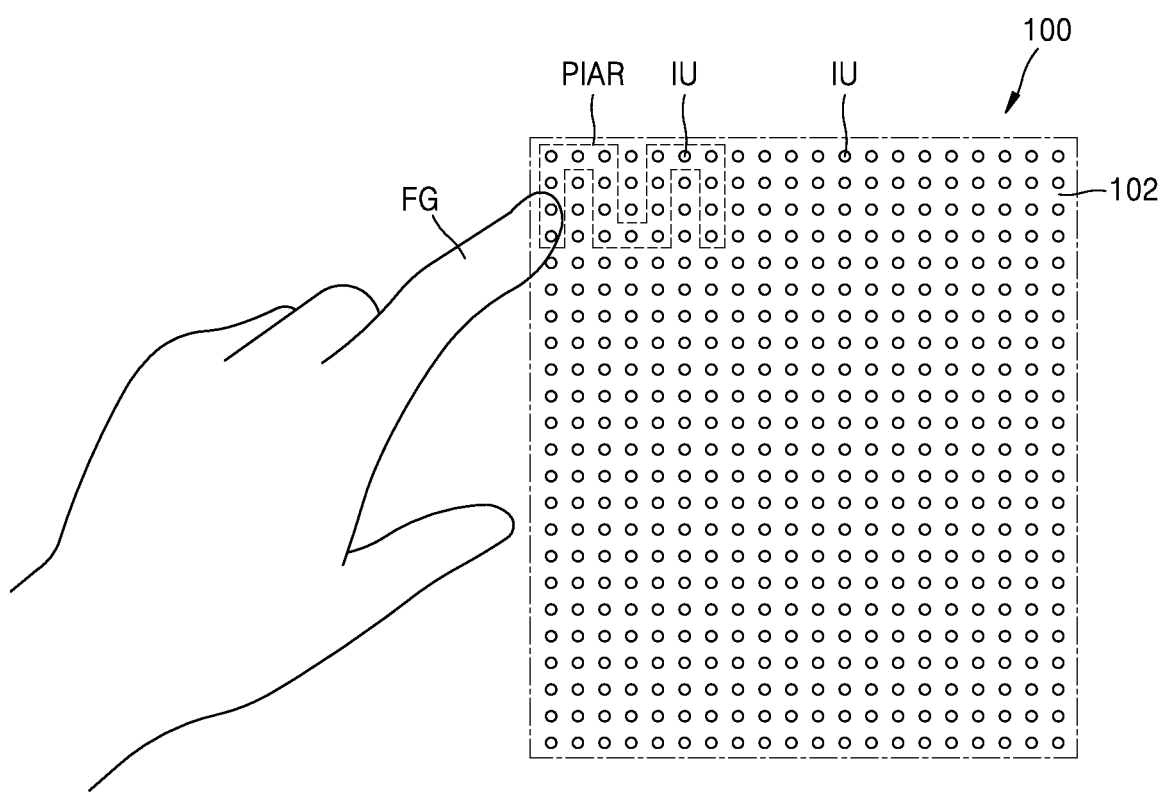
Figure 9:
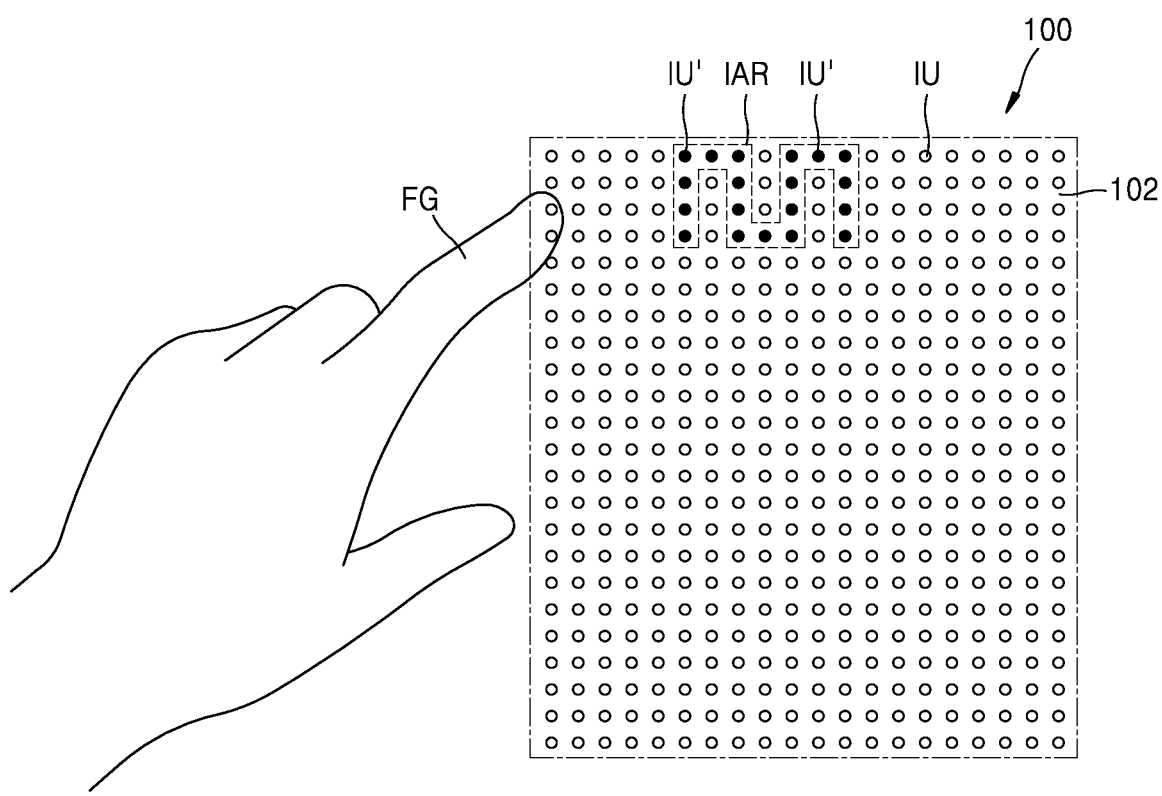

FIGS. 7 to 9 are diagrams for schematically describing an example of an operation of the protruding-based smart tablet according to an embodiment of the present disclosure.

Referring to FIG. 7, a plurality of units IU are illustrated in the expression area of the smart tablet 100. For example, a state before the expression units of the plurality of units IU protrude through the holes may be shown in the drawing.

As shown in FIG. 7, the plurality of units IU arranged to be spaced apart from each other in the transverse and longitudinal directions based on the user at the time using the smart tablet 100 may be arranged in the smart tablet 100.

When using the smart tablet 100, the user may sense protruding states of the expression units of the plurality of units IU using, for example, the finger. At this time, before information is expressed through the protruding of the expression unit of the unit IU, the finger FG of the user may be located to correspond to one or more units IU. Alternatively, as another example, another body area of the user or one area of each of other various objects may be located to correspond to the unit IU, and as a specific example, may block the hole through which the expression unit of the unit IU protrudes.

Referring to FIG. 8, it is illustrated that a preliminary information area PIAR is formed. The preliminary information area PIAR may include the plurality of units IU that are selected to transmit information to the user from among the entire units IU. In addition, the preliminary information area PIAR may be an area before the unit IU operates, for example, an area before the expression unit of the unit IU protrudes.

In this case, the finger FG of the user may overlap one area in the preliminary information area PIAR. For example, the finger FG may correspond to one or more units IU corresponding to the preliminary information area PIAR, and as a specific example, may block the holes through which the expression units of one or more units IU protrude.

In such a case, the exact position of the finger FG of the user may be easily identified through the above-described sensing unit, and the unit IU covered corresponding to the finger FG may be easily confirmed from among the plurality of units IU.

Referring to FIG. 9, it is illustrated that an information area IAR is formed instead of the preliminary information area PIAR. The information area IAR and the preliminary information area PIAR are the same in shape and different only in formed position.

For example, corresponding protruding units IU' included in the information area IAR may protrude, and may be sensed by the user, and the corresponding protruding units IU' are different from the units IU included in at least one preliminary information area PIAR.

As shown in FIG. 8, when an object such as the finger FG of the user corresponds to the preliminary information area PIAR, the movement of the unit IU may be controlled without starting the movement allowing the unit IU to protrude as it is. Specifically, the information area IAR may be formed by shifting the position of the preliminary information area PIAR by a set distance in one direction or in a direction crossing the one direction, and then, the corresponding protruding units IU' included in the information area IAR may start a protruding movement. The "set distance" may include a position not limited by at least an object such as the finger FG of the user, and the information sensed by the sensing unit may be used for the "set distance."

According to an optional embodiment, a reference point may be used when the preliminary information area PIAR is shifted in position to the information area IAR. Among the plurality of units IU corresponding to the preliminary information area PIAR, the unit IU on the most end portion, for example, the unit IU on the most left lower end based on the user may be determined as the reference point, and the reference point may be moved by the "set distance," and then, the corresponding protruding units IU' operate to correspond to the shape of the preliminary information area PIAR to express the information area IAR, thereby providing various pieces of information to the user.

Figure 10:
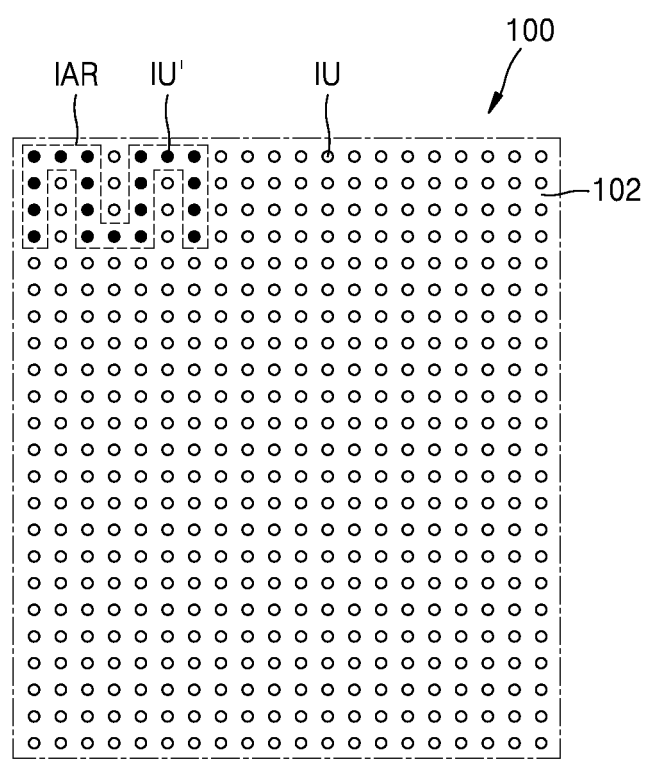
FIG. 10 is a diagram for schematically describing another example of the operation of the protruding-based smart tablet according to an embodiment of the present disclosure.

FIG. 10 is a diagram for schematically describing another example of the operation of the protruding-based smart tablet according to an embodiment of the present disclosure.

Referring to FIG. 10, it is illustrated that the information area IAR is formed in the same position and in the same shape as the preliminary information area PIAR of FIG. 8.

In addition, FIG. 10 is illustrated by removing the finger FG of the user from FIG. 8.

For example, the finger FG of the user may be sensed in the state of FIG. 8, and contents such as movement restrictions may be notified to the user. The notification may include voice information such as "please lift your finger up for a moment," and in addition to that, voice information having various contents may be generated and stored, and then notified to the user.

In addition, as another example, the user may be notified through the vibration of the smart tablet 100.

With such notification, the user may lift the finger FG or at least move the finger FG from the preliminary information area PIAR.

When there is no obstacle, which is caused by an object, on the unit IU of the preliminary information area PIAR due to the user's operation, the unit IU may move to protrude in the preliminary information area PIAR as in the information area IAR.

The smart tablet of the present embodiment may express one or more pieces of information to the user by using at least the plurality of expression units. For example, when the expression units selectively protrude, the user with a visual impairment may sense one or more pieces of information by tactilely sensing the protruding, and accordingly, the user may obtain various pieces of information using the smart tablet.

According to an optional embodiment, when the expression units selectively protrude, the smart tablet may transmit one or more pieces of information by allowing the protruding to be visually sensed.

When a user, for example, a user with a visual impairment, uses the smart tablet, the user may almost always place his or her finger on the smart tablet, for example, may very quickly move his or her finger on the expression area while coming into contact with the expression unit in order to sense that the expression unit protrudes.

In this case, the smart tablet may transmit information one time or multiple times, and furthermore, may transmit the information time-sequentially through the expression unit, and may form a preliminary information area including, for example, the expression units that will protrude. In addition, whether the user's finger is placed on the preliminary information area may be sensed, and when the finger is not placed, in the preliminary information area, the expression units may protrude to form an information area.

When the finger overlaps at least a portion of the preliminary information area, the sensing unit may sense the overlapping portion of the preliminary information area. The sensing unit may use, for example, an optical member, and as a specific example, the sensing unit may include a form in which a plurality of laser sensors are arranged in one direction. The plurality of laser sensors are arranged on one side of the smart tablet, and may identify the expression unit on which the user's finger is placed to correspond thereto from among the plurality of expression units.

With such sensing, the user may be notified using sound, for example, voice information or notified through vibration, so that the user lifts or moves his or her finger, and when the user's finger is removed from the preliminary information area, in the preliminary information area, the expression units may protrude as they are to form the information area.

In addition, as another example, the expression units at which the user's finger is not located may be sensed, and an information area including the expression units at which the finger is not located may be formed to allow the expression units corresponding to the information area to protrude. Specifically, an information area may be formed by shifting the preliminary information area from the position of the preliminary information area in one direction or a direction crossing the one direction. In this case, the expression unit serving as a reference point of the preliminary information area may be used for convenience of shifting.

The smart tablet includes a plurality of units, and may quickly and precisely control operations of the plurality of units, and when an object such as a user's finger corresponds to the unit in advance and blocks the protruding of the expression unit during such precise control, the case in which the amount of power is increased by trying to protrude with excessive resistance to the finger may be reduced or prevented.

Figure 11:
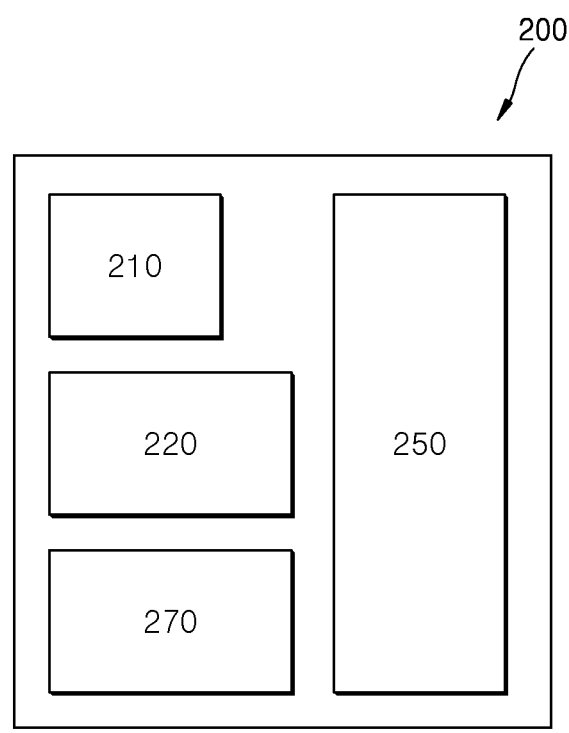
FIG. 11 is a diagram for schematically describing a protruding-based smart tablet according to another embodiment of the present disclosure.

FIG. 11 is a diagram for schematically describing a protruding-based smart tablet according to another embodiment of the present disclosure.

Referring to FIG. 11, a protruding-based smart tablet (hereinafter, referred to as a "smart tablet") 200 of the present embodiment relates to a protruding-based smart tablet including an expression area sensed by a user, and may include a sensing unit 250, an information generation control unit 270, an expression unit 210, and a movement control unit 220.

The expression unit 210 may be provided in plural, such that each expression unit 210 is formed to perform a protruding movement so that a user senses the protrusion.

The smart tablet 200 may include an expression area through which information that can be sensed by the user is expressed, and the plurality of expression units 210 may be arranged in the expression area.

The expression unit 210 may move to protrude so that the user senses the protruding through a tactile sense. According to an optional embodiment, the user may also sense the protruding through a visual sense.

The sensing unit 250 may be formed to sense a user manipulation area on the expression area.

For example, whether a user's hand is present on the expression area may be sensed and, as a specific example, a position of the user's hand may be sensed.

According to an optional embodiment, whether a user's finger is placed to correspond to at least one of the plurality of expression units 210 in the expression area of the smart tablet 200 may be sensed.

As an example, when the user moves the finger in the expression area of the smart tablet 200, the sensing unit 250 may sense the movement of the finger and sense a path along which the finger is moved in the expression area.

As a specific example, when the user writes a character or draws a certain shape with the finger on the expression area of the smart tablet 200, the sensing unit 250 may sense various pieces of information such as the character written by or the shape drawn with the finger by sensing a movement path of the user's finger.

The sensing unit 250 may include various types of devices.

As an example, the sensing unit 250 may use an optical member, for example, a laser sensor. As a specific example, the sensing unit 250 may include a plurality of laser sensors arranged in one direction.

A position of the user's finger in one direction (e.g., an X-direction) may be identified by checking which one of the plurality of laser sensors arranged in the one direction (e.g., the X-direction) senses the user's finger, and a position of the user's finger in a direction (e.g., a Y-direction) crossing the one direction may be identified by sensing a distance between each laser sensor and the finger.

As a result, the position of the user's finger may be sensed, and furthermore, a movement path of the finger may be precisely confirmed when the finger moves.

The information generation control unit 270 may generate expression information by identifying the user manipulation area sensed by the sensing unit 250.

For example, when the user manipulation area sensed by the sensing unit 250 includes a movement path on the expression area, the information generation control unit 270 may include the movement path as the expression information.

According to an optional embodiment, the information generation control unit 270 may generate expression information with a character, a figure, or the like written by the user while moving the finger, and in this case, the information generation control unit 270 may generate an information area corresponding to the corresponding expression information, so that the expression units corresponding to the information area are selected.

The movement control unit 220 may control a moving force according to the information generated by the information generation control unit 270 and transmit the moving force to the expression unit 210.

For example, the expression unit 210 corresponding to the information area generated by the information generation control unit 270 may move by the moving force controlled by the movement control unit 220.

Among the plurality of expression units 210, the expression unit 210 receiving the moving force according to the control of the movement control unit 220 may perform a protruding movement, and the expression unit 210 performing such a protruding movement may be located in the information area generated by the information generation control unit 270.

As a result, when the user writes a character or draws a picture on the expression area with the finger, a shape corresponding to the character written by or the picture drawn by the user may be expressed in a shape in which the expression units 210 protrude, and this may be tactilely or visually sensed by the user.

According to an optional embodiment, when the user's finger is already placed in the information area, similarly to the above-described embodiment, a preliminary information area may be formed before the information area is formed, and the information area may be expressed after the user is notified and the finger is removed. In addition, as another example, the preliminary information area may be formed, and then the preliminary information area may be shifted in one direction or a direction crossing the preliminary information area before the expression unit is moved, so that the information area may be expressed without interruption of the finger.

The movement control unit 220 may move in one direction (for example, upward) in which the expression unit 210 protrudes, and may move in a direction opposite thereto.

As a specific example, the movement control unit 220 may linearly move along one direction (for example, upward) in which the expression unit 210 protrudes.

In addition, as another example, the movement control unit 220 may perform an angular movement or a rotational movement, and accordingly, the expression unit 210 connected to the movement control unit 220 may be moved to protrude.

According to an optional embodiment, the movement control unit 220 may include a driving-providing area, from which a driving force is provided, and a movement area, which is connected to the driving-providing area and to which the driving force is provided. In the movement area, the movement control unit 220 may linearly or angularly move by the driving force, and the expression unit 210 may move by the movement of the movement control unit 220.

The movement control unit 220 may be formed to control the movement of the expression unit 210, for example, when the expression unit 210 is provided in plural, the movement control unit 220 may be provided in plural to respectively correspond to the plurality of expression units 210.

Figure 12:
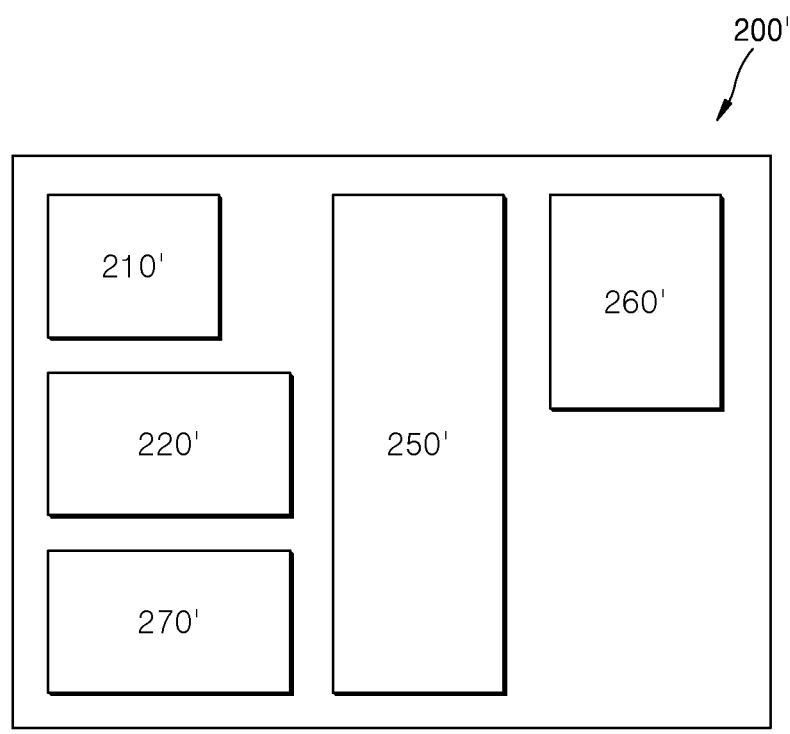
FIG. 12 is a diagram illustrating an optional embodiment of the smart tablet of FIG. 11.

FIG. 12 is a diagram illustrating an optional embodiment of the smart tablet of FIG. 11.

Referring to FIG. 12, a protruding-based smart tablet 200' of the present embodiment relates to a protruding-based smart tablet including an expression area sensed by a user, and may include a sensing unit 250', an information generation control unit 270', an expression unit 210', a movement control unit 220', and an operation analysis control unit 260'.

The expression unit 210' may be provided in plural, such that each expression unit 210' is formed to perform a protruding movement so that a user senses the expression unit 210'.

The smart tablet 200' may include an expression area through which information that can be sensed by the user is expressed, and the plurality of expression units 210' may be arranged in the expression area.

The expression unit 210' may move to protrude so that the user senses the protruding through a tactile sense. According to an optional embodiment, the user may also sense the protruding through a visual sense.

The sensing unit 250' may be formed to sense a user manipulation area on the expression area.

For example, whether a user's hand is present on the expression area may be sensed and, as a specific example, a position of the user's hand may be sensed.

According to an optional embodiment, whether a user's finger is placed to correspond to at least one of the plurality of expression units 210' in the expression area of the smart tablet 200' may be sensed.

As an example, when the user moves the finger in the expression area of the smart tablet 200', the sensing unit 250' may sense the movement of the finger and sense a path along which the finger is moved in the expression area.

As a specific example, when the user writes a character or draws a certain shape with the finger on the expression area of the smart tablet 200', the sensing unit 250' may sense various pieces of information such as the character written by or the shape drawn with the finger by sensing a movement path of the user's finger.

The sensing unit 250' may include various types of devices.

As an example, the sensing unit 250' may use an optical member, for example, a laser sensor. As a specific example, the sensing unit 250' may include a plurality of laser sensors arranged in one direction.

A position of the user's finger in one direction (e.g., an X-direction) may be identified by checking which one of the plurality of laser sensors arranged in the one direction (e.g., the X-direction) senses the user's finger, and a position of the user's finger in a direction (e.g., a Y-direction) crossing the one direction may be identified by sensing a distance between each laser sensor and the user's finger.

As a result, the position of the user's finger may be sensed, and furthermore, a movement path of the finger may be precisely confirmed when the finger moves.

According to an optional embodiment, the operation analysis control unit 260' may analyze operation contents of the user using the result sensed by the sensing unit 250'.

For example, when the user performs one or more operations on the expression area through the finger, the result of the user's operation through the finger may be analyzed by analyzing time-sequential positions of the finger, and a time-sequential movement path of the finger may be identified as a result of the operations through the finger.

The information generation control unit 270' may generate expression information by identifying the user manipulation area sensed by the sensing unit 250'. According to an optional embodiment, the information generation control unit 270' may generate an information area corresponding to the movement path of the user's finger analyzed by the operation analysis control unit 260'.

According to an optional embodiment, the information generation control unit 270' may generate expression information with a character, a figure, or the like written by the user while moving the finger, and in this case, the information generation control unit 270' may generate an information area corresponding to the corresponding expression information, so that the expression units corresponding to the information area are selected.

The movement control unit 220' may control a moving force according to the information generated by the information generation control unit 270' and transmit the moving force to the expression unit 210'.

For example, the expression unit 210' corresponding to the information area generated by the information generation control unit 270' may move by the moving force controlled by the movement control unit 220'.

Among the plurality of expression units 210', the expression unit 210' receiving the moving force according to the control of the movement control unit 220' may perform a protruding movement, and the expression unit 210' performing such a protruding movement may be located in the information area generated by the information generation control unit 270'.

As a result, when the user writes a character or draws a picture on the expression area with the finger, a shape corresponding to the character written by or the picture drawn by the user may be expressed in a shape in which the expression units 210' protrude, and this may be tactilely or visually sensed by the user.

According to an optional embodiment, when the user's finger is already placed in the information area, similarly to the above-described embodiment, a preliminary information area may be formed before the information area is formed, and the information area may be expressed after the user is notified and the finger is removed. In addition, as another example, the preliminary information area may be formed, and then the preliminary information area may be shifted in one direction or a direction crossing the preliminary information area before the expression unit is moved, so that the information area may be expressed without interruption of the finger.

The movement control unit 220' may move in one direction (for example, upward) in which the expression unit 210' protrudes, and may move in a direction opposite thereto.

As a specific example, the movement control unit 220' may linearly move along one direction (for example, upward) in which the expression unit 210' protrudes.

In addition, as another example, the movement control unit 220' may perform an angular movement or a rotational movement, and accordingly, the expression unit 210' connected to the movement control unit 220' may be moved to protrude.

According to an optional embodiment, the movement control unit 220' may include a driving-providing area, from which a driving force is provided, and a movement area, which is connected to the driving-providing area and to which the driving force is provided. In the movement area, the movement control unit 220' may linearly or angularly move by the driving force, and the expression unit 210' may move by the movement of the movement control unit 220'.

The movement control unit 220' may be formed to control the movement of the expression unit 210', for example, when the expression unit 210' is provided in plural, the movement control unit 220' may be provided in plural to respectively correspond to the plurality of expression units 210'.

Figure 13:
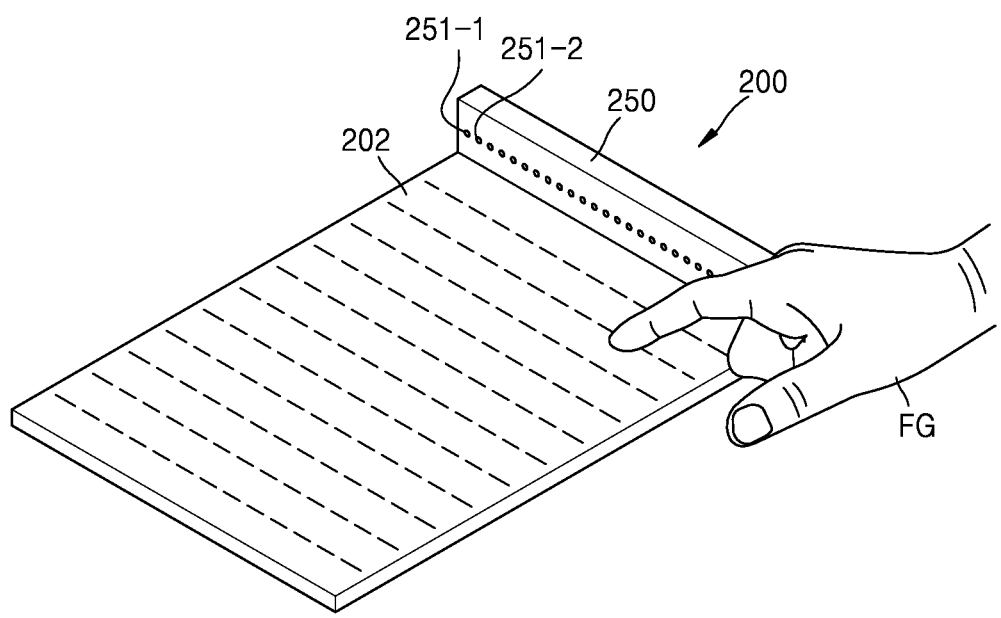
FIG. 13 is an exemplary diagram of the protruding-based smart tablet of FIG. 11.

FIG. 13 is an exemplary diagram of the protruding-based smart tablet of FIG. 11.

Referring to FIG. 13, the smart tablet 200 may include an expression area DA and a sensing unit 250.

The expression area DA may include an area in which a plurality of expression units (not shown) are arranged, for example, may include an area in which a plurality of expression units (not shown) arranged to be spaced apart from each other in one direction (X-axis direction) and a plurality of expression units (not shown) arranged to be spaced apart from each other in one direction (Y-axis direction) crossing the X-axis direction.

Information may be transmitted to a user through a protruding shape of the expression units arranged in the expression area DA, and for example, the expression units of the expression area DA may protrude to correspond to a shape of the information area generated by the information control unit as described above, and the user may sense the protrusions tactilely through a finger FG.

According to an optional embodiment, the smart tablet 200 includes a cover unit 202, and the expression area DA may be located on one surface of the cover unit 202. In addition, a plurality of holes (not shown) may be formed in the cover unit 202, and the plurality of expression units may move to protrude respectively through the holes (not shown). A detailed description thereof will be provided below.

The sensing unit 250 may be disposed to be connected to one surface of the cover unit 202 and may be coupled thereto. In addition, according to an optional embodiment, the sensing unit 250 may be formed to be separated from the cover unit 202, and may be mounted on the cover unit 202.

The sensing unit 250 may include a plurality of position confirming members 251-1 and 251-2. For example, each of the plurality of position confirming members 251-1 and 251-2 may be an optical member, and may include a laser sensor.

In addition, an appropriate number of position confirming members 251-1 and 251-2 may be arranged to correspond to the entire width of the expression area DA in one direction.

As an example, based on the user at the time using the smart tablet 200, the sensing unit 250 may be disposed on an upper portion of the cover unit 202, and the plurality of position confirming members 251-1 and 251-2 may be arranged in a transverse direction.

Accordingly, each of the plurality of position confirming members 251-1 and 251-2 may operate to confirm the position of the finger FG of the user in the transverse direction in the expression area DA. In addition, when the finger FG of the user forms a movement path, e.g., writing a character or drawing a picture, on the expression area DA, time-sequential positions of the finger FG of the user may be identified, and as a result, information on the movement path may be identified.

Figure 14:
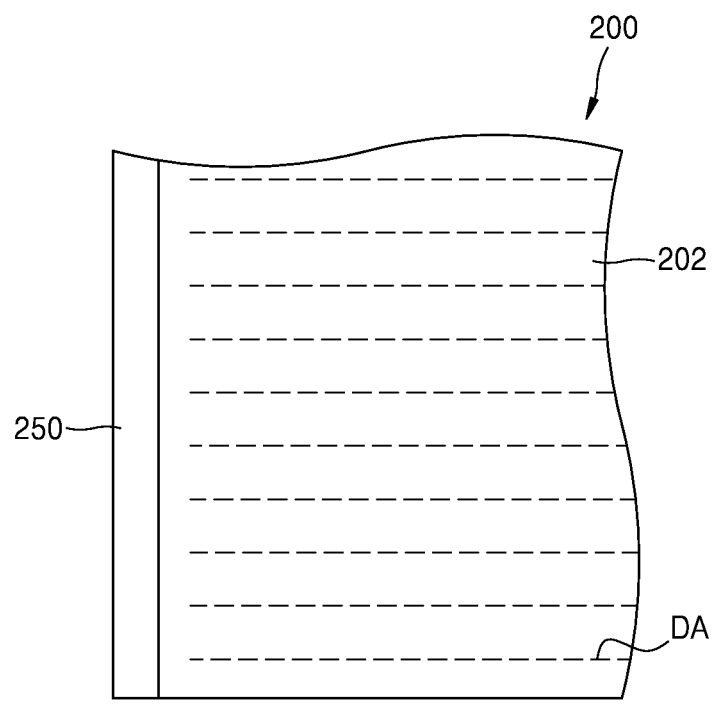
FIG. 14 is another exemplary diagram of the protruding-based smart tablet of FIG. 11.

FIG. 14 is another exemplary diagram of the protruding-based smart tablet of FIG. 11.

Referring to FIG. 14, based on the user at the time using the smart tablet 200, the sensing unit 250 may be disposed on a side surface of the cover unit 202, for example, on a left side of the cover unit 202, and the plurality of position confirming members may be arranged in the longitudinal direction.

Accordingly, each of the plurality of position confirming members of the sensing unit 250 may operate to confirm the position of the finger FG of the user in the longitudinal direction in the expression area DA.

In addition, the position of the finger FG of the user in the transverse direction may be confirmed through the position confirming member corresponding to the finger FG of the user.

Although not shown, the structure of FIG. 6 of the above-described embodiment may be selectively applied to the present embodiment.

Figure 15:
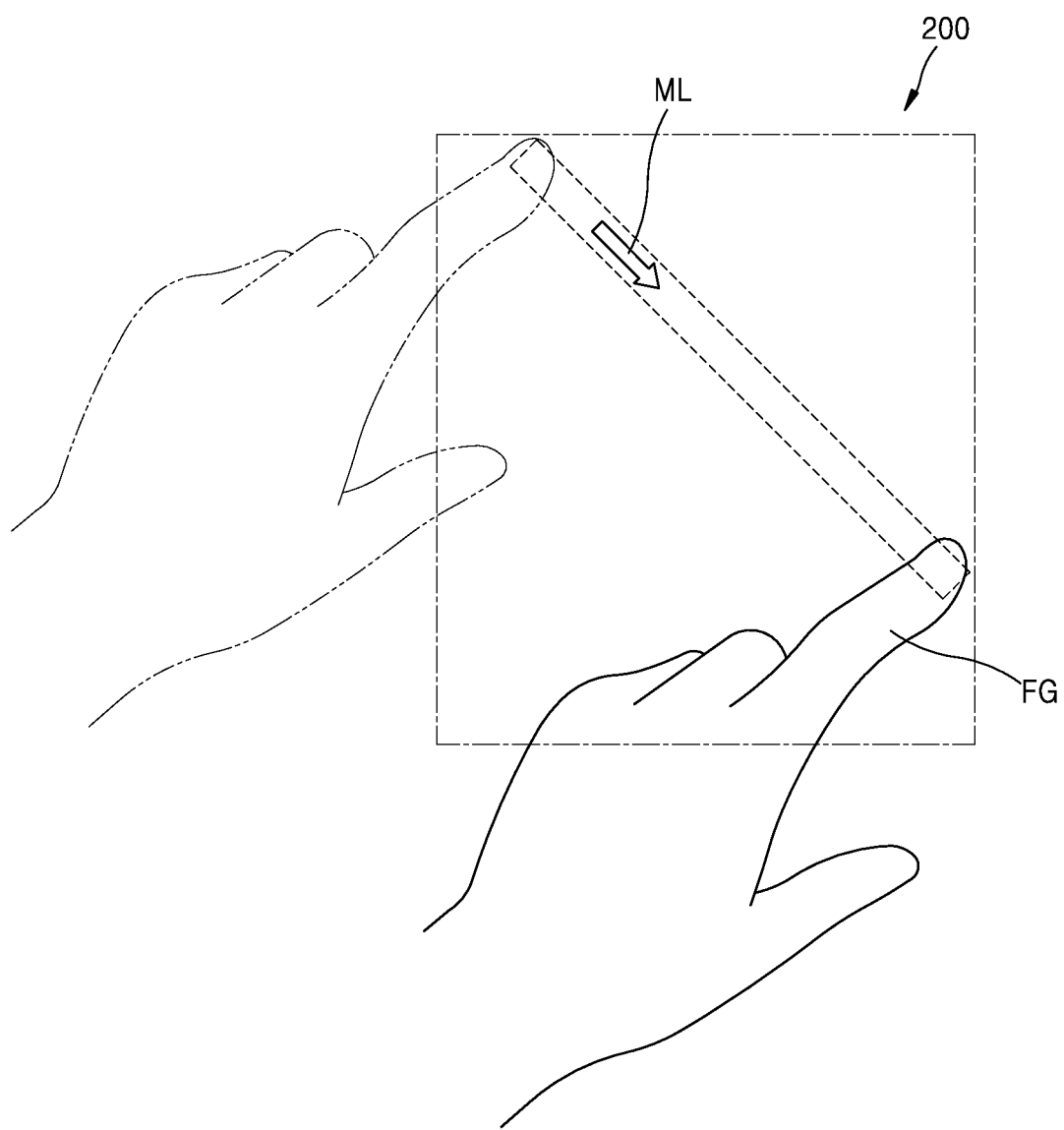
FIGS. 15 and 16 are diagrams for schematically describing an example of an operation of the protruding-based smart tablet of FIG. 11.
Figure 16:
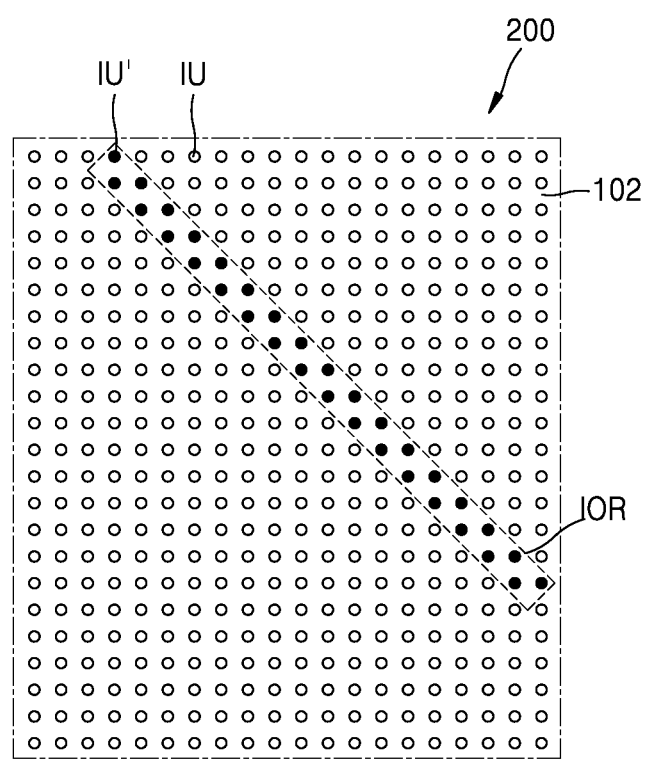

FIGS. 15 and 16 are diagrams for schematically describing an example of an operation of the protruding-based smart tablet of FIG. 11.

Referring to FIG. 15, a plurality of units IU are illustrated in the expression area of the smart tablet 200. For example, a state before the expression units of the plurality of units IU protrude through the holes may be shown in the drawing.

As shown in FIG. 15, the plurality of units IU arranged to be spaced apart from each other in the transverse and longitudinal directions based on the user at the time using the smart tablet 200 may be arranged in the smart tablet 200.

Referring to FIG. 15, a manipulation path ML of the finger FG of the user is illustrated. For example, as illustrated in FIG. 15, the user may perform an operation of drawing a straight line inclined downward in a diagonal direction from upper right to lower left based on the user's view.

FIG. 15 illustrates one example, and the user may form various manipulation paths using the finger FG or various objects.

Referring to FIG. 16, it is illustrated that an information area IOR is formed to correspond to a shape of the manipulation path ML of the user.

As a specific example, corresponding protruding units IU' corresponding to the information area IOR protrude so that the user senses the protruding.

The user may sense the corresponding protruding units IU' of the information area IOR, for example, by tactilely. Accordingly, the user may confirm a character, a figure, or the like written or drawn by himself or herself, and as a specific example, when the user has a visual impairment, the user may confirm a character, a figure, or a picture drawn by himself or herself by tactilely sensing the corresponding protruding units IU' of the information area IOR immediately after drawing the character, the figure, or the picture.

FIG. 16 illustrates that the information area IOR is formed to substantially overlap a position of the manipulation path ML.

According to an optional embodiment, the information area IOR may be formed at a position different from that of the manipulation path ML, for example, at a position to which the manipulation path ML is shifted in one direction or a direction crossing the one direction. As a specific example, the information area IOR may be formed in a shape corresponding to the manipulation path ML but at a different position.

In addition, according to an optional embodiment, the convenience of use of the smart tablet may be improved by forming the information area IOR that has the same shape as the manipulation path ML and is enlarged or reduced only in size.

The smart tablet of the present embodiment may express one or more pieces of information to the user by using at least the plurality of expression units. For example, when the expression units selectively protrude, the user with a visual impairment may sense one or more pieces of information by tactilely sensing the protruding, and accordingly, the user may obtain various pieces of information using the smart tablet.

According to an optional embodiment, when the expression units selectively protrude, the smart tablet may transmit one or more pieces of information by allowing the protruding to be visually sensed.

When the user uses the smart tablet, the user may form various manipulation areas on the expression area by using the finger, and for example, may perform an operation of writing a character or drawing a picture on the expression area with the finger.

The sensing unit may sense the manipulation area of the user's finger on the expression area, and through such sensing, a time-sequential change in position of the finger may be identified. Accordingly, a movement path of a finger may be identified, and expression information may be generated.

The expression information may include an information area, and the expression information may be sensed by the user by moving the expression units corresponding to the information area to protrude.

As a result, as the expression unit senses the information area, the user may identify the result of the manipulation, such as writing a character or drawing a figure or various other pictures on the expression area, performed by himself or herself with the finger.

The user may easily determine his or her manipulation area, and for example, when the user has a visual impairment, the user may practice writing a character, drawing a picture, or the like, and then analyze the results of the practice by himself or herself, so that autonomous information acquisition and training may be easily performed.

Figure 17:
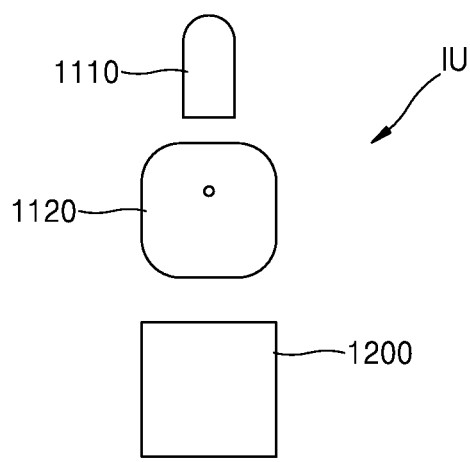
FIG. 17 is a diagram for schematically describing one unit included in the protruding-based smart tablet according to an embodiment of the present disclosure.

FIG. 17 is a diagram for schematically describing one unit included in the protruding-based smart tablet according to an embodiment of the present disclosure.

Referring to FIG. 17, one unit IU is illustrated, and the unit IU may be the unit IU included in one of the smart tablets described in the above-described embodiments.

The unit IU may include an expression unit 1110, a moving unit 1120, and a driving unit 1200.

The expression unit 1110 may be formed to protrude based on a user so that at least one area thereof may be sensed by the user. For example, the expression unit 1110 may perform a linear movement, an angular movement, or a rotational movement.

The moving unit 1120 may be formed to provide a moving force to the expression unit 1110, and may receive the moving force from the driving unit 1200. The moving unit 1120 may perform a linear movement, an angular movement, or a rotational movement due to the moving force, and the expression unit 1110 disposed to be connected to, for example, to be in contact with the moving unit 1120 in at least one area may be moved by such a movement.

The driving unit 1200 may transmit the moving force to the moving unit 1120 so that the moving unit 1120 moves.

The driving unit 1200 may include various forms, for example, may use a current or a magnetic force. According to an optional embodiment, the driving unit 1200 may use an electromagnet.

In the above-described embodiments, the movement control unit may include the moving unit 1120 and the driving unit 1200.

Hereinafter, various units IU will be exemplified.

Figure 18:
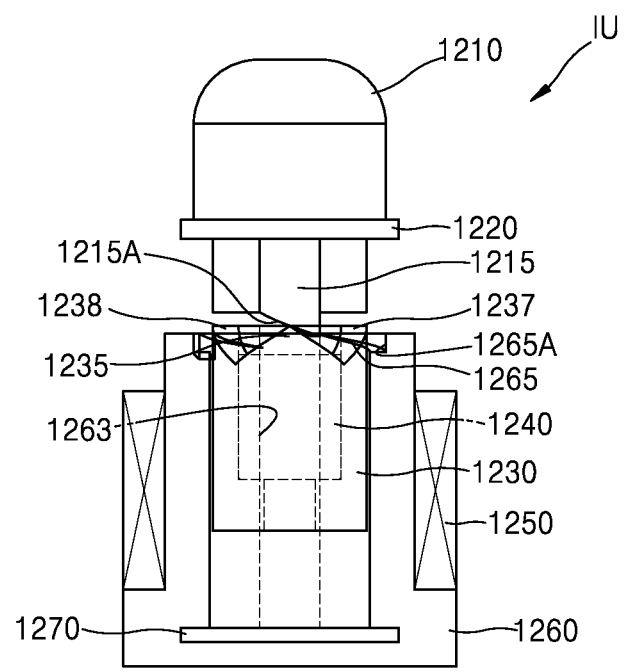
FIGS. 18 and 19 are diagrams for schematically describing an example of one unit included in the protruding-based smart tablet according to an embodiment of the present disclosure.
Figure 19:
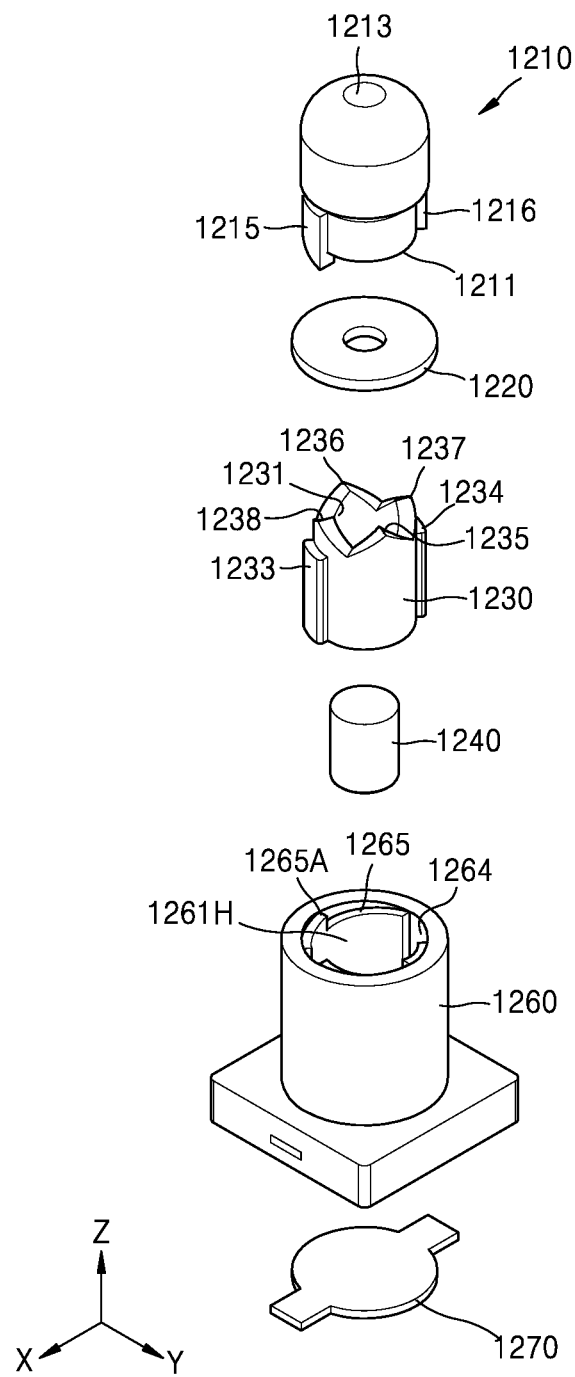

FIGS. 18 and 19 are diagrams for schematically describing an example of one unit included in the protruding-based smart tablet according to an embodiment of the present disclosure.

FIG. 18 is a cross-sectional diagram of one unit taken along one direction, and FIG. 19 is a schematic exploded perspective diagram of one unit illustrated for convenience of description.

The unit IU may include an expression unit 1210, a moving unit 1230, a magnetic unit 1240, a coil unit 1250, and a base unit 1260.

According to an optional embodiment, the unit IU of the present embodiment may further include an expression unit insert 1220.

According to an optional embodiment, the unit IU may further include a base unit insert 1270.

The expression unit 1210 may move according to the movement of the moving unit 1230 to be described later and may positionally move upward and downward at least in a lengthwise direction of the expression unit 1210. Accordingly, the expression unit 1210 may be moved to protrude in one direction, and a user may sense the movement of the expression unit 1210 tactilely or visually.

The expression unit 1210 may include a body member 1211, an expression member 1213, and transmission members 1215 and 1216.

The body member 1211 may constitute a lower area of the expression unit 1210 and support the expression member 1213. In addition, the body member 1211 may be moved by a force transmitted through the transmission member 1215 and may also transmit the force to the expression member 1213, such that the expression member 1213 may be moved.

According to an optional embodiment, the body member 1211 may have a pillar shape having a certain height and a certain width, may have a curved outer circumferential surface, and may include, for example, at least one area of a side surface of a cylinder.

The expression member 1213 may be connected to the body member 1211 and may be moved by the body member 1211, and for example, the expression member 1213 may move simultaneously with the body member 1211. The expression member 1213 may have a shape protruding in one direction, and for example, the expression member 1213 may have a pillar-shaped area and a protruding area connected thereto.

In this case, the protruding area of the expression member 1213 may have a curved surface and may also have rounded corners.

The expression member 1213 may include various materials, and may include an insulating material as a light and durable material. For example, the expression member 1213 may include a resin-based organic material. As another example, the expression member 1213 may include an inorganic material, such as a ceramic material.

In addition, according to another optional embodiment, the expression member 1213 may include a material like a metal or glass.

According to an optional embodiment, a connection area (not shown) may be formed between the body member 1211 and the expression member 1213, and specifically, the connection area (not shown) has a width smaller than those of the body member 1211 and the expression member 1213, such that a separation space (not shown) is between the body member 1211 and the expression member 1213.

The transmission members 1215 and 1216 may have a shape extending from the body member 1211 and have a shape protruding downward more than the body member 1211. Accordingly, the transmission members 1215 and 1216 may be located closer to the moving unit 1230 than the body member 1211.

According to an optional embodiment, a plurality of transmission members 1215 and 1216 may be provided. That is, the transmission members 1215 and 1216 may include a first transmission member 1215 and a second transmission member 1216.

The first transmission member 1215 may have various shapes, and for example, the first transmission member 1215 may have a shape that protrudes to pass the lowermost surface of the body member 1211 in the lengthwise direction of the expression unit 1210. That is, the first transmission member 1215 may have a shape elongated to pass through a surface of the body member 1211 opposite an area facing the expression member 1213 from among areas of the body member 1211.

The first transmission member 1215 may have a shape protruding from a side surface of the body member 1211. Accordingly, a side surface of the first transmission member 1215 and the side surface of the body member 1211 may form a curved shape without being coplanar with each other.

According to an optional embodiment, the first transmission member 1215 may include a slide surface 1215A at an end thereof, and for example, the slide surface 1215A may have a shape inclined in one direction.

The first transmission member 1215 may correspond to guide grooves 1263 and 1264 of the base unit 1260, and the slide surface 1215A may correspond to an engaging sliding area 1265 and a connecting sliding area (not shown). Detailed descriptions thereof will be given later.

The second transmission member 1216 may have various shapes, and for example, the second transmission member 1216 may have a shape that protrudes to pass the lowermost surface of the body member 1211 in the lengthwise direction of the expression unit 1210. That is, the second transmission member 1216 may have a shape elongated to pass through the surface of the body member 1211 opposite an area facing the expression member 1213 from among the areas of the body member 1211.

The second transmission member 1216 may have a shape protruding from the side surface of the body member 1211. Accordingly, a side surface of the second transmission member 1216 and the side surface of the body member 1211 may form a curved shape without being coplanar with each other.

According to an optional embodiment, the second transmission member 1216 may include a slide surface at an end thereof, and for example, the slide surface may have a shape inclined in one direction.

The second transmission member 1216 may correspond to the guide grooves 1263 and 1264 of the base unit 1260, The first transmission member 1215 and the second transmission member 1216 may be arranged at various positions, and for example, the first transmission member 1215 and the second transmission member 1216 may be formed to correspond to a first guide groove 1263 and a second guide groove 1264 of the base unit 1260 to be described later.

According to an optional embodiment, the first transmission member 1215 and the second transmission member 1216 may have a symmetrical shape around the center of the expression unit 1210.

For example, a distance from the first transmission member 1215 to the second transmission member 1216 in the clockwise direction may be the same as a distance therebetween in the counterclockwise direction.

According to another embodiment, when the body member 1211 is rotated 180 degrees around a rotation axis, the first transmission member 1215 and the second transmission member 1216 may switch positions with each other, and, when the body member 1211 is rotated 360 degrees, the first transmission member 1215 and the second transmission member 1216 may return to their original positions.

According to another optional embodiment, the expression unit 1210 may include three, four, or more transmission members (not shown). In this case, that is, in a case in which the expression unit 1210 includes three transmission members, when the expression unit 1210 is rotated 120 degrees, the transmission members may each be moved to the position of the adjacent transmission member. In a case in which the expression unit 1210 includes four transmission members, when the expression unit 1210 is rotated 90 degrees, the transmission members may each be moved to the position of the adjacent transmission member, According to an optional embodiment, the unit IU may further include the expression unit insert 1220.

The expression unit insert 1220 may have a width greater than that of the expression member 1213, and for example, the expression unit insert 1220 may be formed to have a wider area than the expression member 1213.

According to an optional embodiment, the expression unit insert 1220 may be formed to have a more protruding shape than the expression member 1213, the body member 1211, and the transmission members 1215 and 1216, and accordingly, the expression unit insert 1220 may serve to restrict the descending of the expression unit 1210, that is, the movement of the expression unit 1210 in a direction toward a bottom surface of the base unit 1260.

The expression unit insert 1220 may include various materials.

According to an optional embodiment, the expression unit insert 1220 may include a magnetic material, e.g., iron, nickel, or a stainless steel-based alloy material.

The coil unit 1250 may be disposed to surround an outer circumferential surface of the base unit 1260, and may have, for example, a wound shape.

By applying a current to the coil unit 1250, a magnetic field for the magnetic unit 1240 may be generated. For example, an attractive force or a repulsive force may be generated.

The moving unit 1230 may be formed to have at least an accommodation space 1231, and the magnetic unit 1240 may be disposed in the accommodation space 1231. The magnetic unit 1240 may include, for example, a permanent magnet as a material having a magnetic force.

According to an optional embodiment, the magnetic unit 1240 may include, for example, iron, nickel, or a stainless steel-based alloy material as a magnetic material.

The magnetic unit 1240 may be moved by a magnetic field generated by a current flowing through the coil unit 1250, and the moving unit 1230 may move together with the magnetic unit 1240.

To facilitate the movement of the moving unit 1230, the magnetic unit 1240 and the moving unit 1230 may be fixed. The moving unit 1230 may make the expression unit 1210 moved, and for example, the moving unit 1230 may push up the moving unit 1230 while supporting the expression unit 1210.

The moving unit 1230 may include a plurality of support members 1235, 1236, 1237, and 1238.

For example, the moving unit 1230 may include a first support member 1235, a second support member 1236, a third support member 1237, and a fourth support member 1238. The plurality of support members 1235, 1236, 1237, and 1238 may have a shape protruding in a lengthwise direction of the moving unit 1230. Accordingly, the plurality of support members 1235, 1236, 1237, and 1238 may move the expression unit 1210 while supporting the expression unit 1210 during the movement of the moving unit 1230, and for example, the plurality of support members 1235, 1236, 1237, and 1238 may push up the expression unit 1210.

According to an optional embodiment, the plurality of support members 1235, 1236, 1237, and 1238 may move the transmission members 1215 and 1216 of the expression unit 1210 while supporting the transmission members 1215 and 1216.

According to an optional embodiment, the moving unit 1230 may include one or more guides 1233 and 1234. The guides 1233 and 1234 may have a shape protruding from a side surface of the moving unit 1230, A first guide 1233 and a second guide 1234 may move while corresponding to the first guide groove 1263 and the second guide groove 1264 of the base unit 1260, respectively, thereby controlling the rotation or lateral movement of the moving unit 1230.

The base unit 1260 may include a base space 1261H. The moving unit 1230 and the magnetic unit 1240 described above may be arranged in the base space 1261H. In addition, one area of the expression unit 1210 may be disposed in the base space 1261H according to the movement of the expression unit 1210.

According to an optional embodiment, the base unit 1260 may be formed to correspond to a plurality of output units.

According to an optional embodiment, the base unit 1260 may include the engaging sliding area 1265 and a connecting sliding area.

The engaging sliding area 1265 may have a shape formed by removing a predetermined thickness from the base space 1261H and may be formed to be connected to one side of each of the guide grooves 1263 and 1264. That is, one engaging sliding area 1265 may be formed to be connected to a side surface of the first guide groove 1263 in a first direction, and another engaging sliding area 1265 may be formed to be connected to a side surface of the second guide groove 1264 in the first direction.

The engaging sliding area 1265 may be an area in which each of the first transmission member 1215 and the second transmission member 1216 of the expression unit 1210 moves, that is, slides. That is, when the first transmission member 1215 and the second transmission member 1216 move over the first guide groove 1263 and the second guide groove 1264 through the ascending movement of the expression unit 1210, the first transmission member 1215 and the second transmission member 1216 may naturally move, e.g., slide to the engaging sliding area 1265, and thus the expression unit 1210 may descend by a certain height.

According to an optional embodiment, the engaging sliding area 1265 may have a sloped surface, and when the slide surface 1215A of the first transmission member 1215 and the slide surface of the second transmission member 1216 have sloped surfaces, the sloped surface of the engaging sliding area 1265 may be inclined in the same direction as the slide surface 1215A of the first transmission member 1215 and the slide surface of the second transmission member 1216.

In addition, an engaging portion 1265A is formed at each end of the engaging sliding area 1265, and thus the first transmission member 1215 and the second transmission member 1216 may be caught and stopped by the engaging portions 1265A without continuing the movements thereof. That is, the expression unit 1210 does not continuously descend and may maintain a stationary state even without a support of the moving unit 1230.

The connecting sliding area may have a shape formed by removing a predetermined thickness from the base space 1261H and may be formed to be connected to each of the engaging sliding areas 1265, e.g., to the engaging portion 1265A of each of the engaging sliding areas 1265. That is, one side of one connecting sliding area may be connected to the engaging portion 1265A of one engaging sliding area 1265, and the other side of the one connecting sliding area may be connected to a side surface of the first guide groove 1263 in a second direction.

According to an optional embodiment, the base unit insert 1270 may be further included in one area inside the base unit 1260.

According to an optional embodiment, the base unit insert 1270 may include a magnetic material, e.g., iron, nickel, or a stainless steel-based alloy material.

When the base unit insert 1270 includes a magnetic material, attractive force is applied between the base unit insert 1270 and the moving unit 1230 by the magnetic field between the base unit insert 1270 and the magnetic unit 1240, thereby facilitating the movement of the moving unit 1230 during the descending movement of the moving unit 1230.

In addition, when the moving unit 1230 maintains a descended state, the moving unit 1230 may stably maintain its position by the magnetic field between the magnetic unit 1240 and the base unit insert 1270.

The expression unit 1210 of the present embodiment may perform an angular movement to protrude in a state of being supported by the moving unit 1230.

Figure 20:
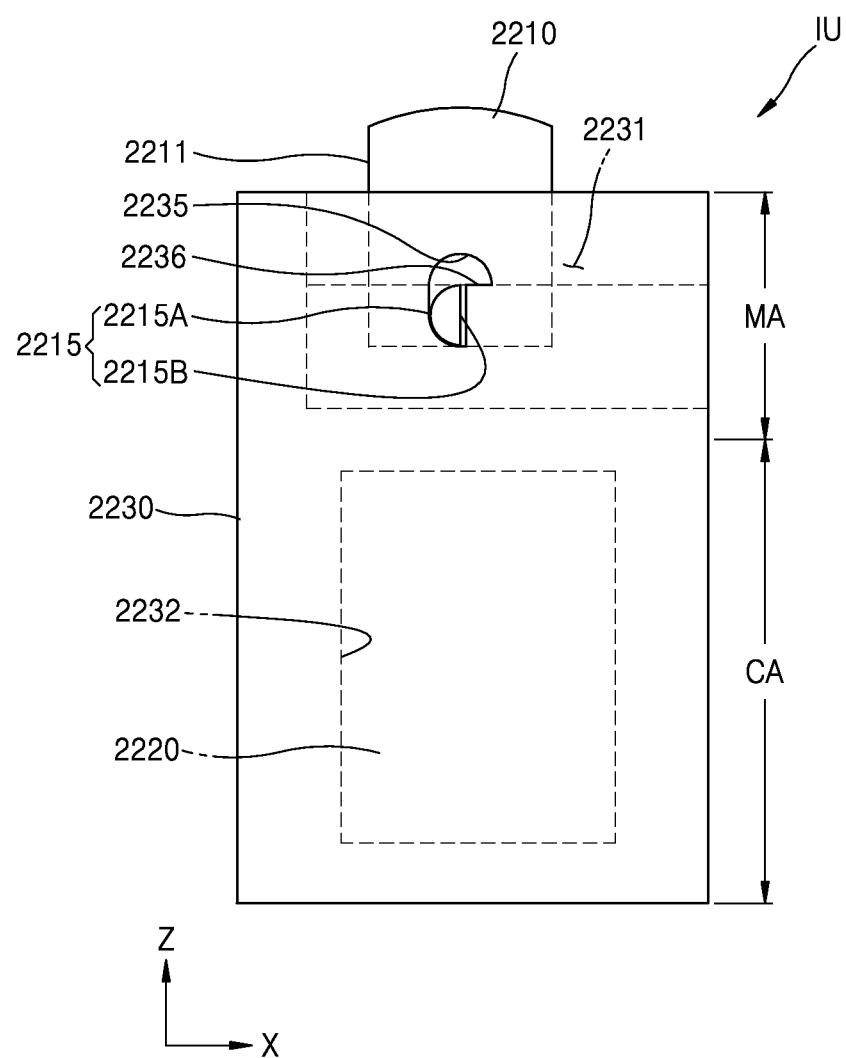
FIGS. 20 and 21 are diagrams for schematically describing another example of one unit included in the protruding-based smart tablet according to an embodiment of the present disclosure.
Figure 21:
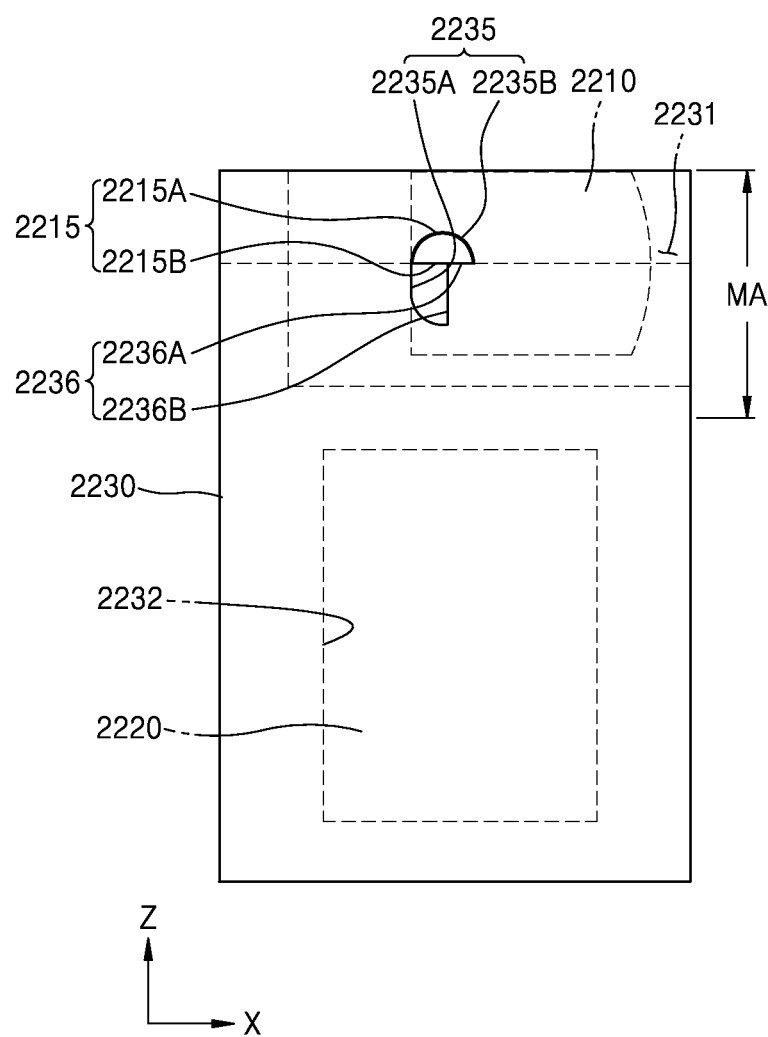

FIGS. 20 and 21 are diagrams for schematically describing another example of one unit included in the protruding-based smart tablet according to an embodiment of the present disclosure.

One unit IU may include a movement expression unit 2210, a coil unit 2220, and a base unit 2230.

The coil unit 2220 may be disposed in a second area CA distinguished from a first area MA of the base unit 2230, and for example, may be disposed in a second accommodation unit 2232 spaced apart and distinguished from a first accommodation unit 2231.

By applying a current to the coil unit 2220, a magnetic field for the movement expression unit 2210 may be generated. For example, an attractive force or a repulsive force may be generated.

The movement expression unit 2210 may include a magnetic material.

According to an optional embodiment, the movement expression unit 2210 may include a magnetic material, e.g., a permanent magnet.

According to an optional embodiment, the movement expression unit 2210 may include, for example, iron, nickel, or a stainless steel-based alloy material as a magnetic material.

The movement expression unit 2210 may be moved by a reaction with the magnetic field generated by the current of the coil unit 2220, that is, by a mutual magnetic field.

In addition, as a specific example, when the movement expression unit 2210 includes a permanent magnet, the N and S poles of the permanent magnet may be arranged in a lengthwise direction of the movement expression unit 2210, which may be a Z-axis direction in FIG. 20.

The movement expression unit 2210 may perform a rotational movement, e.g., an angular movement with a certain angle.

The movement expression unit 2210 may move to protrude in one direction, and the movement expression unit 2210 may positionally move through ascending and descending movements at least in the lengthwise direction of the movement expression unit 2210. Accordingly, the movement expression unit 2210 may be moved to protrude in one direction, and a user may sense the movement of the movement expression unit 2210 tactilely or visually.

The movement expression unit 2210 may include a protrusion 2215 in a shape protruding from a side surface of a main body area 2211.

Although not shown in the drawings, according to an optional embodiment, the movement expression unit 2210 may include two protrusions 2215 in a shape protruding from both side surfaces of the main body area 2211 opposite to each other.

The protrusion 2215 may include a side surface 2215A having at least a curved area and a fixing portion 2215B.

The fixing portion 2215B may have a flat surface in at least one area.

According to an optional embodiment, the main body area 2211 of the movement expression unit 2210 may have an elongated pillar shape.

In this case, an end of the movement expression unit 2210 may have a curved surface, or the movement expression unit 2210 may have rounded corners.

The protrusion 2215 of the movement expression unit 2210 may be formed to be adjacent to an end portion of an area of the side surface of the main body area 2211 of the movement expression unit 2210, that is, an end portion opposite to an end portion protruding toward a user in the lengthwise direction of the movement expression unit 2210.

The base unit 2230 may be formed to accommodate the movement expression unit 2210.

According to an optional embodiment, the base unit 2230 may include the first accommodation unit 2231 in the first area MA corresponding to the movement expression unit 2210.

A driving groove 2235 of the base unit 2230 may be formed to be connected to the first accommodation unit 2231. The protrusion 2215 of the movement expression unit 2210 may correspond to the driving groove 2235.

For example, when the movement expression unit 2210 is disposed in the first accommodation unit 2231, the protrusion 2215 of the movement expression unit 2210 may correspond to the driving groove 2235.

The driving groove 2235 may have a shape passing through a side surface of the base unit 2230 or may have a groove shape.

The driving groove 2235 may include a first area 2235A and a second area 2235B. The first area 2235A may be disposed closer to the second accommodation unit 2232 than the second area 2235B is.

The first area 2235A may be formed to support the protrusion 2215 when the movement expression unit 2210, e.g., the protrusion 2215 of the movement expression unit 2210, descends.

To this end, the first area 2235A may have an edge surface having a shape similar to that of the side surface 2215A of the protrusion 2215 of the movement expression unit 2210, and for example, the first area 2235A may have a curved surface.

In addition, the first area 2235A may have an appropriate width to facilitate the movement of the movement expression unit 2210 in the first direction, that is, an ascending direction, and the movement of returning in an opposite direction. In addition, the first area 2235A may be formed to extend in the first direction to be connected to the second area 2235B.

The second area 2235B may be connected to the first area 2235A and may have a shape extending in the second direction crossing the first direction. As described above, the first direction is a direction in which the movement expression unit 2210 ascends or descends.

The second area 2235B may be formed to correspond to the protrusion 2215 when the movement expression unit 2210 moves in the first direction and then moves in the second direction.

That is, when the movement expression unit 2210 moves to rotate, the protrusion 2215 may ascend from the first area 2235A and then move to rotate by a certain angle to be disposed in the second area 2235B.

The second area 2235B may have a shape corresponding to a state in which the protrusion 2215 is moved to rotate and disposed, and for example, the second area 2235B may have a curved surface.

In addition, the second area 2235B may have an appropriate width to facilitate the movement of the movement expression unit 2210 when the movement expression unit 2210 descends in a direction opposite to the first direction, e.g., moves to rotate and descends, after the movement expression unit 2210 returns in the second direction.

In addition, the second area 2235B may have a shape similar to that of the first area 2235A in a state in which the first area 2235A is rotated.

The base unit 2230 may include a locking protrusion 2236 to maintain a state of the movement expression unit 2210 after the movement expression unit 2210 is disposed in the second area 2235B. The locking protrusion 2236 includes an upper surface 2236A and a side surface 2236B, and the upper surface 2236A and the side surface 2236B of the locking protrusion 2236 may be connected to each other and correspond to the fixing portion 2215B of the protrusion 2215 according to the movement of the movement expression unit 2210.

That is, in the state shown in FIG. 21, when no separate external force is applied, the movement of the fixing portion 2215B of the protrusion 2215 of the movement expression unit 2210, e.g., a rotational movement, may be limited by the side surface 2236B of the locking protrusion 2236.

Due to the mutual magnetic field generated through the coil unit 2220 described above, the movement expression unit 2210 may have an attractive force or repulsive force with respect to the coil unit 2220, and the movement expression unit 2210 may easily perform an angular movement or rotational movement through the restriction and guide between the protrusion 2215 and the driving groove 2235 so that the movement expression unit 2210 may have a protruding shape as shown in FIG. 20 or have a non-protruding shape as shown in FIG. 21.

Figure 22:
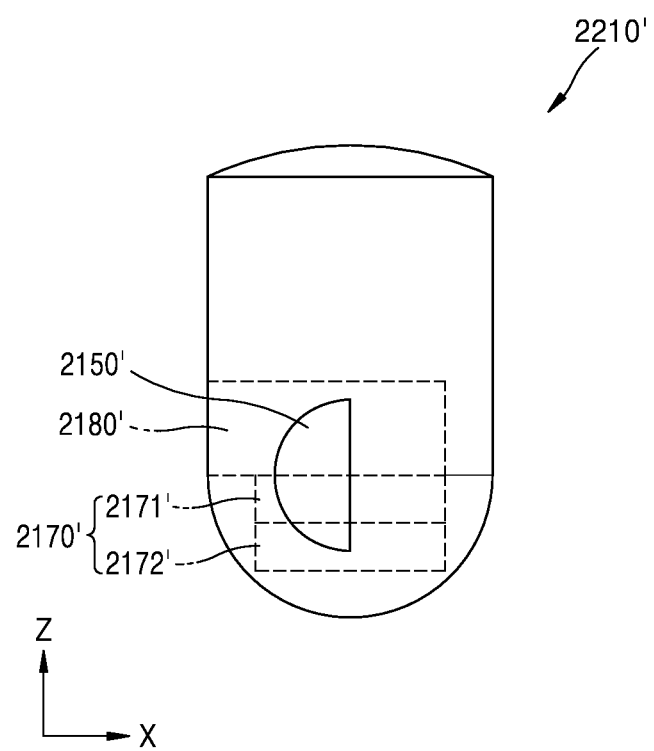
FIG. 22 is a diagram illustrating an optional embodiment of a movement expression unit of FIG. 20.

FIG. 22 is a diagram illustrating an optional embodiment of the movement expression unit of FIG. 20.

A movement expression unit 2210' may include a magnetic unit 2170' and a magnetic body 2180'.

According to an optional embodiment, the magnetic unit 2170' may include a magnetic material, e.g., a permanent magnet. As a specific example, the magnetic unit 2170' may include a first magnetic unit 2171' and a second magnetic unit 2172', and the first magnetic unit 2171' and the second magnetic unit 2172' may have different polarities from each other. As an example, the first magnetic unit 2171' may have an N pole, and the second magnetic unit 2172' may have an S pole. Alternatively, the first magnetic unit 2171' may have an S pole, and the second magnetic unit 2172' may have an N pole.

The magnetic body 2180' has a property of being magnetized in a magnetic field, is, for example, adjacent to the magnetic unit 2170', and may be magnetized by the magnetic unit 2170' to influence a direction of a magnetic field generated by the magnetic unit 2170'.

According to an optional embodiment, the magnetic body 2180' may include various materials, and for example, the magnetic body 2180' may include iron, and as another example, may include nickel or cobalt.

The magnetic body 2180' may be disposed by being tilted at a certain angle with respect to the magnetic unit 2170'.

According to an optional embodiment, the magnetic unit 2170' and the magnetic body 2180' may be arranged to be eccentric to each other, and for example, a center axis of the magnetic unit 2170' and a center axis of the magnetic body 2180' may be misaligned from each other instead of being parallel with each other.

According to an optional embodiment, the center axis of the magnetic unit 2170' may be parallel to a center axis of the movement expression unit 2210', and the center axis of the magnetic body 2180' may be misaligned to the center axis of the movement expression unit 2210' without being parallel therewith.

Accordingly, due to the tilted shape, it is possible to easily generate a torque of the movement expression unit 2210" and control the smooth movement of the movement expression unit 2210', thereby improving the expression precision of the unit IU' and reducing power consumption thereof.

In this case, an end of the movement expression unit 2210' may have a curved surface, or the movement expression unit 2210' may have rounded corners.

Figure 23:
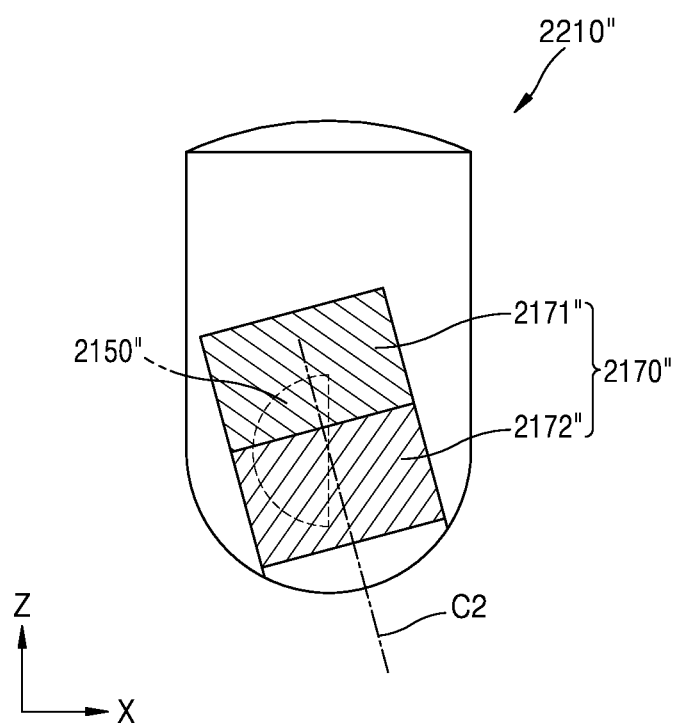
FIG. 23 is a diagram illustrating another optional embodiment of the movement expression unit of FIG. 20.

FIG. 23 is a diagram illustrating another optional embodiment of the movement expression unit of FIG. 20.

Referring to FIG. 23, a movement expression unit 2210" may include a magnetic unit 2170". According to an optional embodiment, the magnetic unit 2170" may include a magnetic material, e.g., a permanent magnet.

The magnetic unit 2170" may include a first magnetic unit 2171" and a second magnetic unit 2172", and specifically, the first magnetic unit 2171" and the second magnetic unit 2172" may have different polarities from each other. For example, the first magnetic unit 2171" may have an N pole, and the second magnetic unit 2172" may have an S pole. Alternatively, the first magnetic unit 2171" may have an S pole, and the second magnetic unit 2172" may have an N pole.

A direction C2" of a magnetic axis of the magnetic unit 2170" may be disposed by being tilted at a certain angle with respect to the movement expression unit 2210".

According to an optional embodiment, the direction C2" of the magnetic axis of the magnetic unit 2170" may be misaligned with a center axis of the movement expression unit 2210" without being parallel therewith.

According to an optional embodiment, a center axis of the magnetic unit 2170" may be tilted to form a certain angle instead of being parallel with the lengthwise direction of the movement expression unit 2210".

Due to the misalignment between the direction C2" of the magnetic axis of the magnetic unit 2170" and the center axis of the movement expression unit 2210", it is possible to easily generate a torque of the movement expression unit 2210", control the smooth movement of the movement expression unit 2210", and reduce power consumption.

The magnetic unit 2170" may be disposed to overlap at least a center point of the movement expression unit 2210" in a lengthwise direction.

According to an optional embodiment, the magnetic unit 2170" may have an extended length to reach the center point of the movement expression unit 2210" in the lengthwise direction.

Accordingly, a torque may be easily generated at the movement expression unit 2210" by changing the center of gravity of the movement expression unit 2210".

FIGS. 24 to 27 are diagrams for schematically describing another example of one unit included in the protruding-based smart tablet according to an embodiment of the present disclosure.

Figure 24:
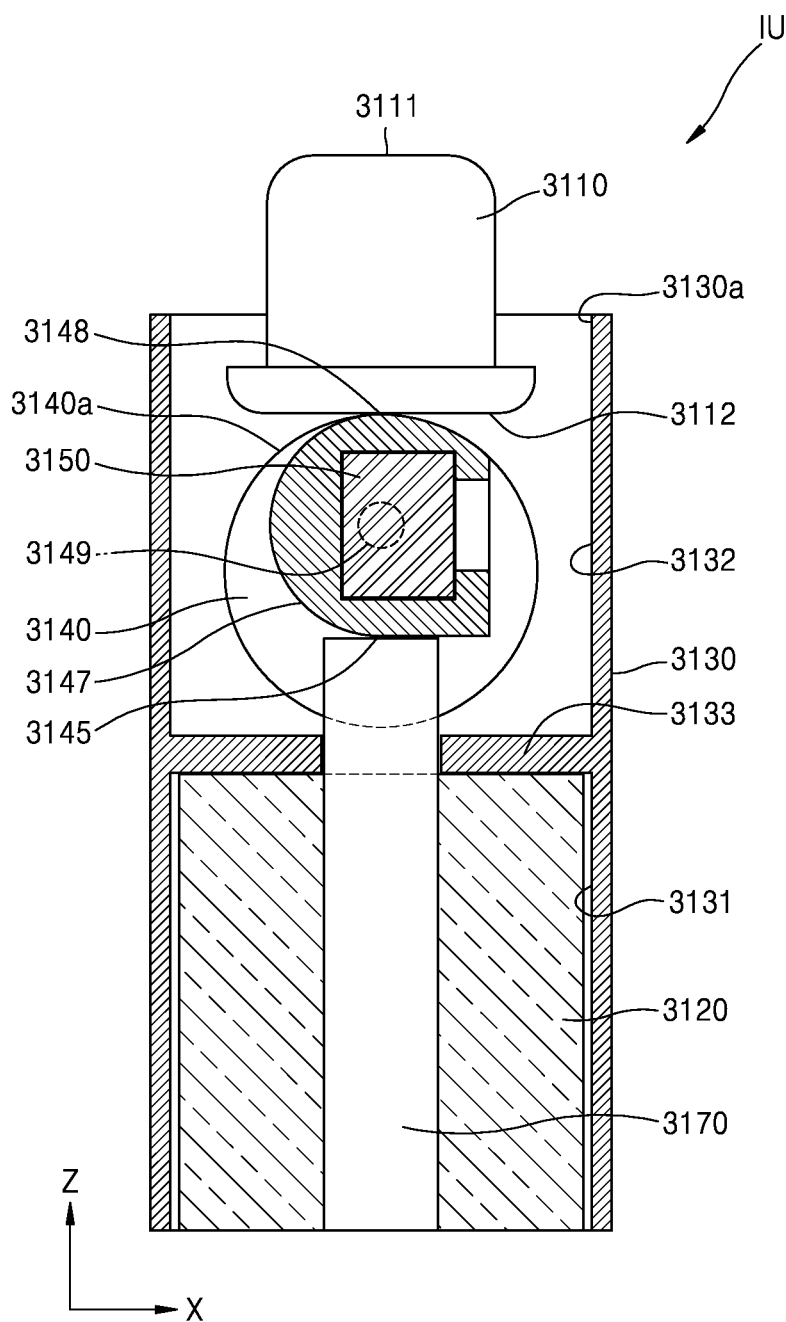
FIGS. 24 to 27 are diagrams for schematically describing another example of one unit included in the protruding-based smart tablet according to an embodiment of the present disclosure.

Referring to FIG. 24, the unit IU may include a base unit 3130, a moving unit 3140, an expression unit 3110, and a coil unit 3120.

The coil unit 3120 may be disposed in a first accommodation unit 3131 of the base unit 3130 and may have, for example, a shape wound around a support unit 3170 with the support unit 3170 at the center.

By applying a current to the coil unit 3120, a magnetic field for the moving unit 3140 may be generated. For example, an attractive force or a repulsive force may be generated.

The expression unit 3110 may move according to the movement of the moving unit 3140 and may positionally move upward and downward at least in a lengthwise direction of the expression unit 3110. Accordingly, the expression unit 3110 may be moved to protrude in one direction, and a user may sense the movement of the expression unit 3110 tactilely or visually.

The expression unit 3110 may include an expression surface 3111 and a support surface 3112.

The support surface 3112 is a surface from among areas of the expression unit 3110 facing the moving unit 3140, and may constitute a lower area of the expression unit 3110 and may contact the moving unit 3140. The moving unit 3140 may transmit a force to the expression unit 3110 through the support surface 3112. For example, a driving surface 3140a of the moving unit 3140 may contact the support surface 3112 and allow the support surface 3112 to move in a first direction, that is, a Z-axis direction in FIG. 24.

The expression surface 3111 is the outermost (e.g., the uppermost) surface from among the areas of the expression unit 3110, and may include an area to be recognized by a user.

For example, the entire area of the expression unit 3110 may be recognized by a user or only the expression surface 3111 may be recognized. For example, the user may sense the movement of the expression unit 3110 by coming into contact with the expression surface 3111, and the user may easily sense the movement of the expression unit 3110 through visual sensing of the expression surface 3111.

According to an optional embodiment, the expression surface 3111 may include a curved surface.

According to an optional embodiment, the support unit 3170 may be further disposed, and for example, the support unit 3170 may include an elongated area.

According to an optional embodiment, one end of the support unit 3170 may be elongated to support the moving unit 3140, and the movement of the moving unit 3140 may be performed while being supported by the one end of the support unit 3170.

According to an optional embodiment, the support unit 3170 may be formed to correspond to a through portion of the base unit 3130.

According to an optional embodiment, the support unit 3170 may include a magnetic material, thereby efficiently generating a magnetic field to reduce the power consumption of the unit IU.

The base unit 3130 may include the first accommodation unit 3131 and a second accommodation unit 3132.

The first accommodation unit 3131 and the second accommodation unit 3132 may be arranged adjacent to each other and may not overlap each other.

According to an optional embodiment, the first accommodation unit 3131 and the second accommodation unit 3132 may be spaced apart from each other.

According to another optional embodiment, the first accommodation unit 3131 and the second accommodation unit 3132 may be connected through a through hole.

The above-described support unit 3170 may be disposed in the first accommodation unit 3131, and one area of the support unit 3170 may be extended and disposed in the second accommodation unit 3132 through a through hole.

Although not shown in the drawings, according to an optional embodiment, a driving groove (not shown) may be formed in the second accommodation unit 3132 of the base unit 3130. For example, driving grooves (not shown) may be formed on both inner side surfaces of the second accommodation unit 3132 of the base unit 3130 facing each other.

The base unit 3130 may have an elongated shape to accommodate the moving unit 3140 and may be formed to completely surround the moving unit 3140.

According to an optional embodiment, the base unit 3130 may include a boundary 3133 between the first accommodation unit 3131 and the second accommodation unit 3132.

The first accommodation unit 3131 and the second accommodation unit 3132 may be separated by the boundary 3133.

According to an optional embodiment, a through hole may be formed at the boundary 3133, such that one area of the support unit 3170 is disposed to extend and pass therethrough.

In addition, the base unit 3130 may include an inlet 3130a, and the inlet 3130a may be connected to the second accommodation unit 3132. The expression unit 3110 may move, such that a length of a portion thereof protruding out of the base unit 3130 through the inlet 3130a varies.

The moving unit 3140 may be disposed in the base unit 3130. The moving unit 3140 may be disposed in the second accommodation unit 3132.

The moving unit 3140 may interact with the magnetic field generated through the coil unit 3120 to perform an angular movement or a rotational movement, and as a result, the expression unit 3110 may be moved up and down by the moving unit 3140.

According to an optional embodiment, a magnetic unit 3150 may be disposed in the moving unit 3140, for example, in an inner space of the moving unit 3140. For example, the magnetic unit 3150 may include a magnetic material, e.g., a permanent magnet.

The magnetic unit 3150 may include a first area (e.g., an N pole or an S pole) and a second area (e.g., an S pole or an N pole) having different polarities, and the first area and the second area having different polarities may be arranged at one point of the rotation of the moving unit 3140 in a direction toward the expression unit 3110, e.g., the Z-axis direction.

For example, in FIG. 24, the first area and the second area of the magnetic unit 3150 having different polarities may be arranged in a direction toward the expression unit 3110, e.g., the Z-axis direction.

The moving unit 3140 may include the driving surface 3140a on at least an outer surface, and the driving surface 3140a may be formed to support the expression unit 3110, thereby providing a driving force for an upward and downward movement of the expression unit 3110.

According to an optional embodiment, the driving surface 3140a of the moving unit 3140 may include a curved surface as the outer surface. According to a more specific embodiment, the driving surface 3140a of the moving unit 3140 may include a boundary line having a circle-like shape.

The moving unit 3140 may include a movement control unit 3149.

A driving position of the moving unit 3140 may be controlled through the movement control unit 3149. For example, when the moving unit 3140 moves, the moving unit 3140 may perform an angular movement or a rotational movement around the movement control unit 3149.

According to an optional embodiment, a center axis of the moving unit 3140 and a center axis movement control unit 3149 may not be coaxial with each other and may be eccentric.

In addition, according to an optional embodiment, the magnetic unit 3150 may not be coaxial with the center axis of the moving unit 3140 and, for example, may be disposed to overlap one area of the movement control unit 3149.

Accordingly, it is possible to easily generate a torque with respect to the moving unit 3140 to allow the moving unit 3140 to perform an angular movement or a rotational movement, thereby efficiently performing a movement with respect to the expression unit 3110 and improving the expression precision of the unit IU. In addition, the power consumption of the unit IU may be reduced.

Figure 27:
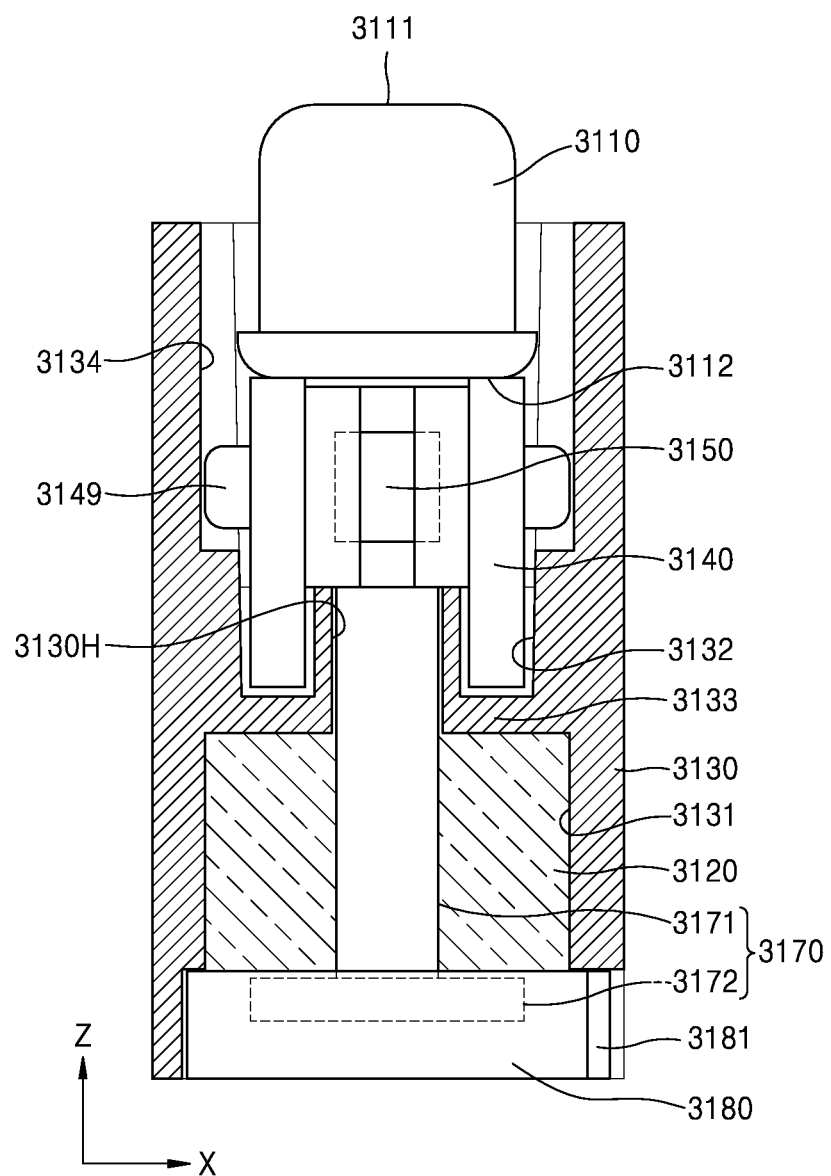

According to an optional embodiment, as shown in FIG. 27, the moving unit 3140 may be formed to include two driving members arranged to face each other. In addition, the two driving members include the driving surface 3140a to support the expression unit 3110 during the movement of the moving unit 3140, thereby providing a driving force to the expression unit 3110. For example, an outer boundary line (e.g., a circle) of the moving unit 3140 including the driving surface 3140a shown in FIG. 24 may be a boundary line of each of the two driving members.

For example, the two driving members may each have a disk-like shape.

The movement control unit 3149 may be disposed on at least one side surface, e.g., both side surfaces, of the moving unit 3140, and may have a shape protruding from a side surface of the moving unit 3140.

According to an optional embodiment, due to the protruding shape of the movement control unit 3149, when the base unit 3130 includes a driving groove 3134 as shown in FIG. 27, the moving unit 3140 may move while the movement control unit 3149 of the moving unit 3140 is being disposed in the driving groove 3134 and corresponding to the driving groove 3134.

A first movement area 3145 and a second movement area 3148 may be arranged in an inner area of the moving unit 3140, for example, in a space between the two driving members.

The first movement area 3145 and the second movement area 3148 may be areas that become the references of the highest point and the lowest point, respectively, during the movement of the moving unit 3140.

According to an optional embodiment, a connection area 3147 may be disposed between the first movement area 3145 and the second movement area 3148, and the connection area 3147 may include a curved surface.

For example, as shown in FIG. 24, when the first movement area 3145 is located at the bottom, the moving unit 3140 may be placed at the lowest point, and thus the expression unit 3110 may also be in a state of being placed at the lowest point, and specifically, a state in which a protruding height of the expression unit 3110 from the base unit 3130 is the smallest, and for example, it may be a state in which the expression unit 3110 of the unit IU is disposed to be unrecognizable by a user.

In this case, the first movement area 3145 may be supported by an upper end of the support unit 3170.

Figure 25:
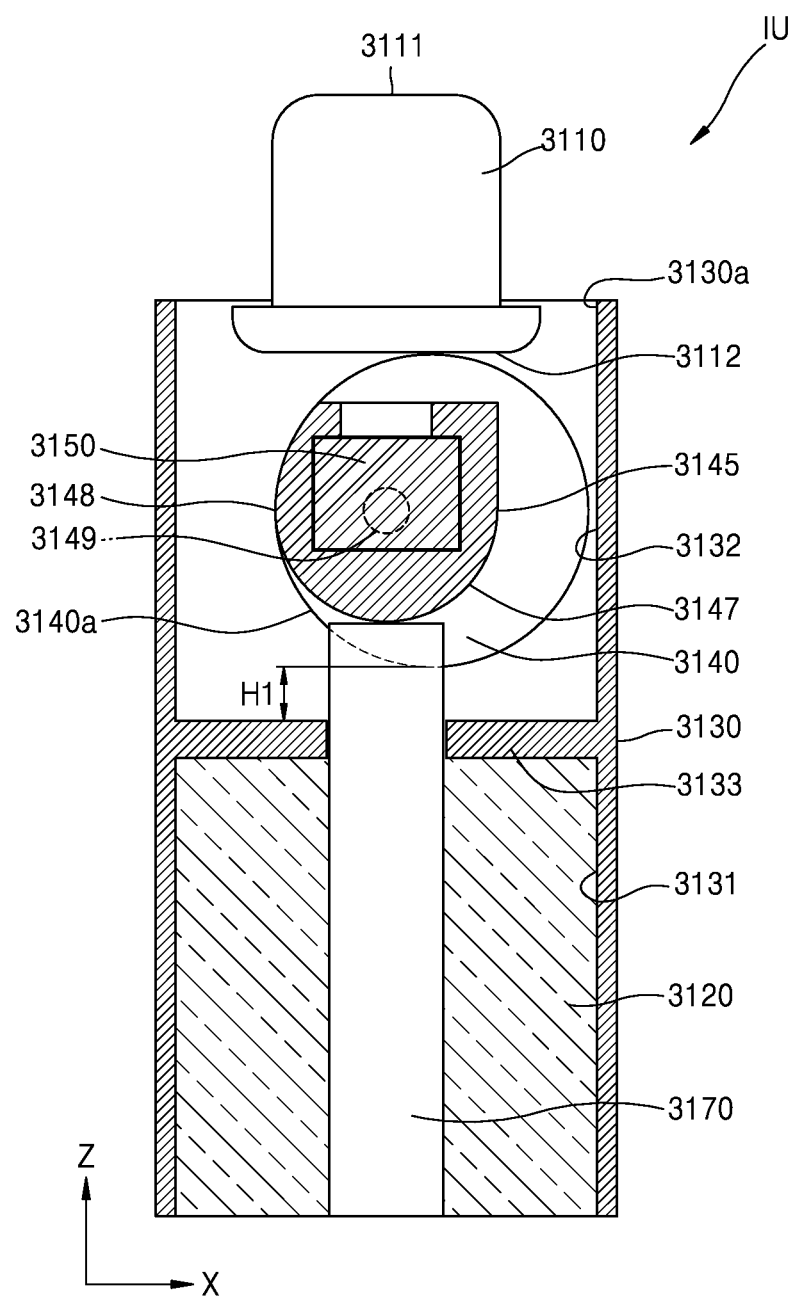

Thereafter, the moving unit 3140 may move due to a mutual reaction with a magnetic field generated by a current passing through the coil unit 3120, and for example, when a magnetic force acts on the magnetic unit 3150 disposed in the moving unit 3140, the connection area 3147 may be supported by the upper end of the support unit 3170. Referring to FIG. 25, the moving unit 3140 may ascend, that is, the uppermost surface of the moving unit 3140 may ascend, and accordingly, the expression unit 3110 may also ascend slightly by a height H1 in FIG. 25.

According to an optional embodiment, since the moving unit 3140 moves to rotate around the movement control unit 3149, the movement control unit 3149 may maintain its position.

Figure 26:
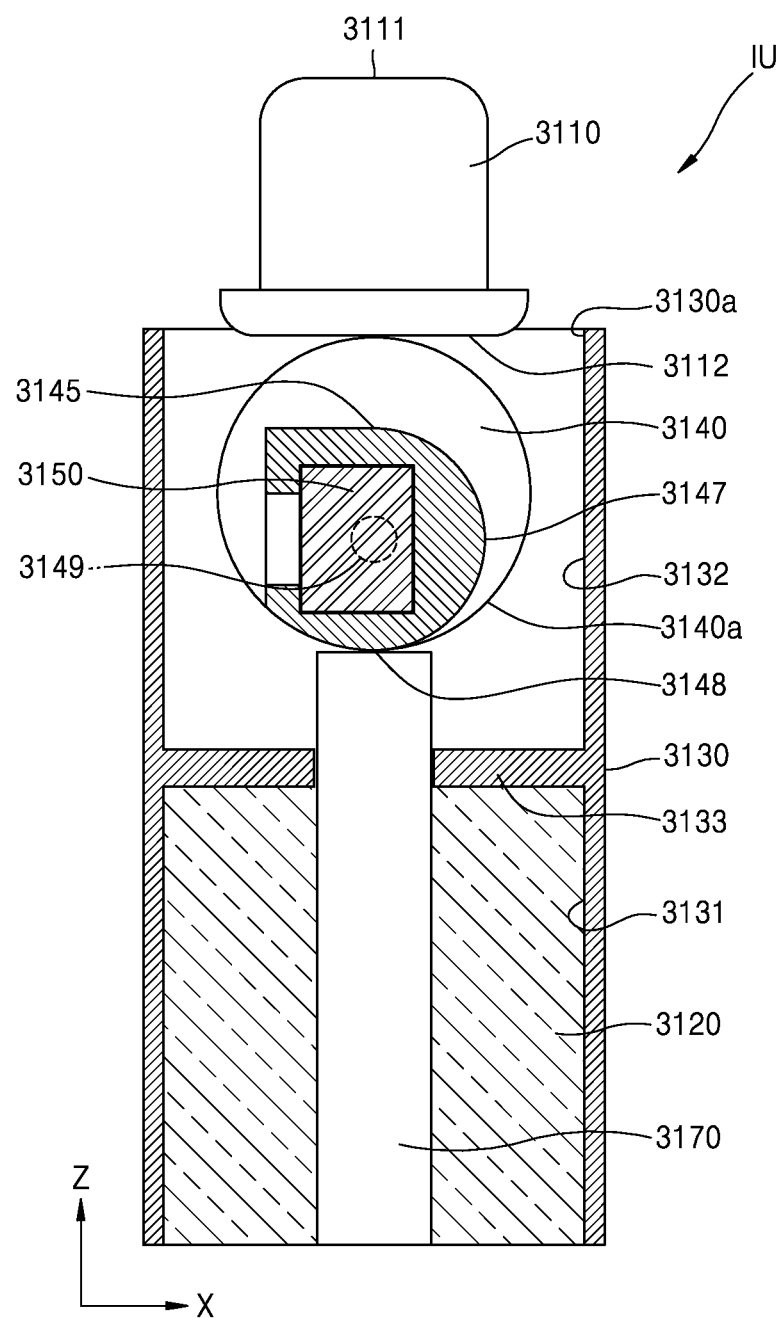

Thereafter, the moving unit 3140 may continuously move by the magnetic field, and for example, the second movement area 3148 may be supported by the upper end of the support unit 3170. Referring to FIG. 26, the moving unit 3140 may ascend, that is, the uppermost surface of the moving unit 3140 may ascend, and accordingly, the expression unit 3110 may also ascend, and the state shown in FIG. 26 may indicate the highest point of the expression unit 3110.

According to an optional embodiment, since the moving unit 3140 moves to rotate around the movement control unit 3149, the movement control unit 3149 may maintain its position.

According to an optional embodiment, the movement from the state of FIG. 24 to the state of FIG. 26 may be continuous. The state of FIG. 25 is for describing one process. When the state of FIG. 24 is changed to the state of FIG. 25, the moving unit 3140 and the expression unit 3110 may continue to move from the state of FIG. 25 without stopping and may be changed to the state of FIG. 26.

During the rotational movement of the moving unit 3140, the support unit 3170 may support at least one area of the connection area 3147 while supporting the first movement area 3145 and before supporting the second movement area 3148, and accordingly, the moving unit 3140 may naturally move, and thus the movement of the expression unit 3110 may be precisely controlled.

A distance between the driving surface 3140a and the first movement area 3145 may be different from a distance between the driving surface 3140a and the second movement area 3148. For example, the distance between the driving surface 3140a and the first movement area 3145 may be greater than the distance between the driving surface 3140a and the second movement area 3148.

According to an optional embodiment, as shown in FIG. 27, the support unit 3170 may include an extension unit 3171 and a body unit 3172.

The extension unit 3171 may be formed to correspond to a through hole 3130H of the base unit 3130. The body unit 3172 may be connected to the extension unit 3171.

According to an optional embodiment, the body unit 3172 and the extension unit 3171 of the support unit 3170 may be integrally formed with each other.

According to an optional embodiment, a support unit 3180 may be further included so that the body unit 3172 is dispose thereon.

The support unit 3180 may be disposed to surround a bottom surface and a side surface of the body unit 3172.

According to an optional embodiment, the support unit 3180 may include a protrusion 3181 in one area, and the one area of the protrusion 3181 may be exposed to a side surface of the base unit 3130 to facilitate handling.

As shown in FIG. 27, according to an optional embodiment, the driving groove 3134 may be formed on inner side surfaces of the second accommodation unit 3132 of the base unit 3130 facing each other, and may be formed in a groove shape or a penetrating area penetrating to the outside.

According to an optional embodiment, the through hole 3130H may be formed in the boundary 3133.

Figure 28:
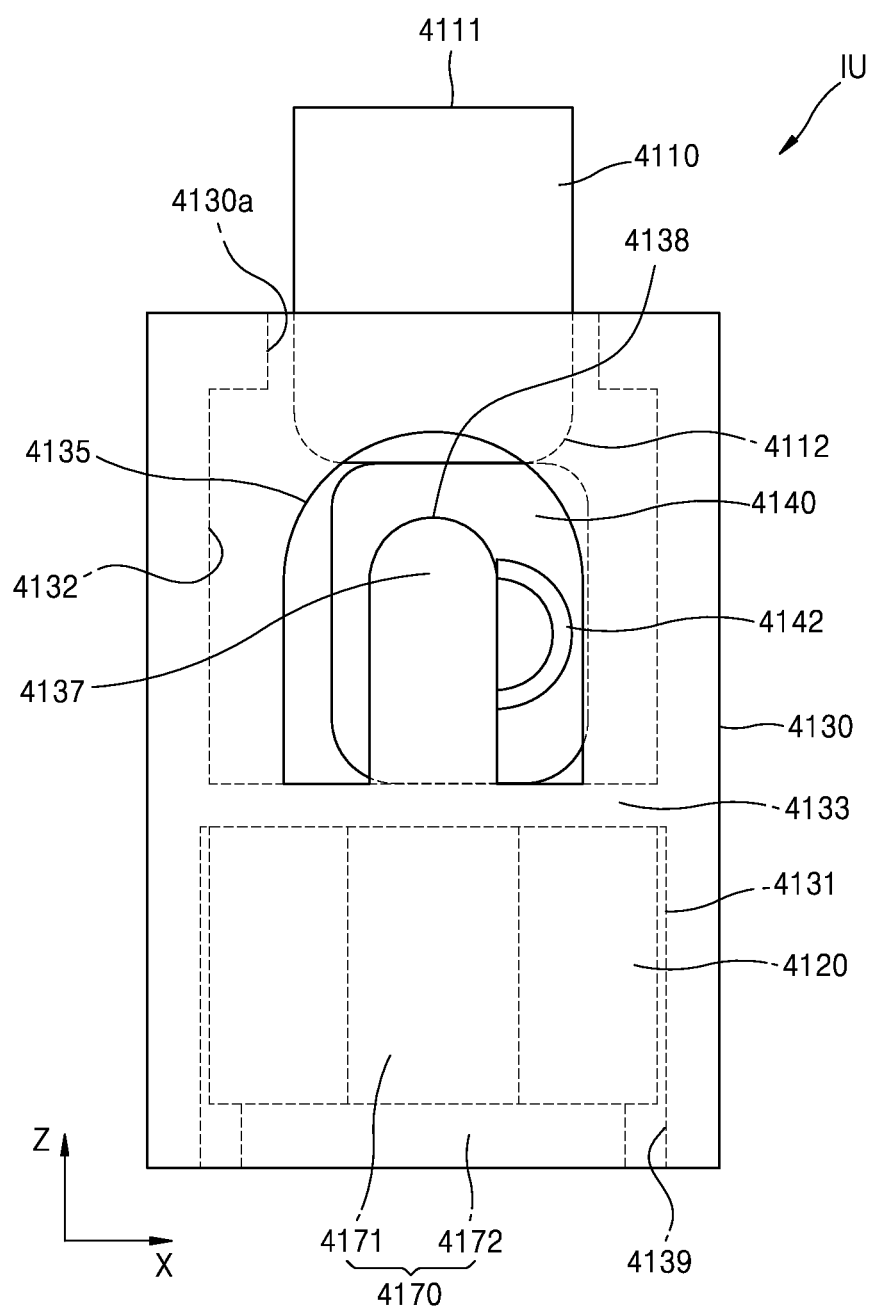
FIG. 28 is a diagram for schematically describing another example of one unit included in the protruding-based smart tablet according to an embodiment of the present disclosure.

FIG. 28 is a diagram for schematically describing another example of one unit included in the protruding-based smart tablet according to an embodiment of the present disclosure.

Referring to FIG. 28, the unit IU may include a base unit 4130, a moving unit 4140, an expression unit 4110, and a coil unit 4120.

The coil unit 4120 may be disposed in a first accommodation unit 4131 of the base unit 4130 and may have, for example, a shape wound around an extension member 4171 of a support unit 4170 with the extension member 4171 at the center.

By applying a current to the coil unit 4120, a magnetic field for the moving unit 4140 may be generated. For example, an attractive force or a repulsive force may be generated.

The base unit 4130 may include one or more guide grooves 4135.

The expression unit 4110 may move according to the movement of the moving unit 4140 and may positionally move upward and downward at least in a lengthwise direction of the expression unit 4110.

Accordingly, the expression unit 4110 may be moved to protrude in one direction, and a user may sense the movement of the expression unit 4110 tactilely or visually.

The expression unit 4110 may include an expression surface 4111 and a support surface 4112.

The support surface 4112 is a surface from among areas of the expression unit 4110 facing the moving unit 4140 and may constitute a lower area of the expression unit 4110 and may contact the moving unit 4140. The moving unit 4140 may transmit a force to the expression unit 4110 through the support surface 4112. For example, one surface of the moving unit 4140 may contact the support surface 4112 and allow the support surface 4112 to move in a first direction, that is, a Z-axis direction in FIG. 28.

The expression surface 4111 is the outermost (e.g., the uppermost) surface from among the areas of the expression unit 4110 and may include an area to be recognized by a user.

For example, the entire area of the expression unit 4110 may be recognized by a user or only the expression surface 4111 may be recognized. For example, the user may sense the movement of the expression unit 4110 by coming into contact with the expression surface 4111, and the user may easily sense the movement of the expression unit 4110 through visual sensing of the expression surface 4111.

According to an optional embodiment, the expression surface 4111 may include a curved surface.

The expression unit 4110 may have various shapes. The expression unit 4110 may include a pillar-shaped area, and for example, the expression unit 4110 may include an area having a shape similar to that of a cylinder.

In addition, according to an optional embodiment, a protruding area of the expression unit 4110 may have a curved surface and may also have rounded corners.

According to an optional embodiment, the support unit 4170 includes a body member 4172, and the extension member 4171 may be connected to the body member 4172.

According to an optional embodiment, the support unit 4170 may include a magnetic material, and, as a specific example, the extension member 4171 may include a magnetic material. Accordingly, in the case of generating a magnetic field for the moving unit 4140, the magnitude of the magnetic field may be increased, and the power consumption of the unit IU may be reduced by efficiently generating the magnetic field.

The base unit 4130 may include the first accommodation unit 4131, a second accommodation unit 4132, and the guide groove 4135.

The first accommodation unit 4131 and the second accommodation unit 4132 may be arranged adjacent to each other and may not overlap each other.

According to an optional embodiment, the first accommodation unit 4131 and the second accommodation unit 4132 may be spaced apart from each other.

According to another optional embodiment, the first accommodation unit 4131 and the second accommodation unit 4132 may be connected through a through hole.

The guide groove 4135 may be formed in the second accommodation unit 4132. For example, the guide grooves 4135 may be formed on both inner side surfaces of the second accommodation unit 4132 of the base unit 4130 facing each other. According to another optional embodiment, the guide groove 4135 may be formed on only one inner side surface.

The guide groove 4135 may have a through-hole shape, and as another example, the guide groove 4135 may have a groove shape that is not exposed to the outside of the base unit 4130.

The guide groove 4135 may include a first groove, a second groove spaced apart from the first groove, and a connection groove connecting the first groove and the second groove.

According to an optional embodiment, an intermediate unit 4137 may be formed between the first groove and the second groove of the guide groove 4135 facing each other and spaced apart from each other.

The connection groove of the guide groove 4135 may be formed to interconnect, for example, between the first groove on a left side and the second groove on a right side in FIG. 28. According to an optional embodiment, the connection groove may include a curved surface and may be adjacent to an upper surface 4138 of the intermediate unit 4137.

Accordingly, at least one area of the guide groove 4135 may have a shape similar to an arc.

According to an optional embodiment, the guide groove 4135 may have a shape similar to the alphabet "U."

According to an optional embodiment, the base unit 4130 may include a boundary 4133 between the first accommodation unit 4131 and the second accommodation unit 4132.

According to an optional embodiment, although not shown in the drawings, a through hole may be formed in the boundary 4133, and one area of the support unit 4170 may be disposed to extend and pass therethrough.

In addition, the base unit 4130 may include an inlet 4130*a*, and the inlet 4130*a* may be connected to the second accommodation unit 4132. The expression unit 4110 may move, such that a length of a portion thereof protruding out of the base unit 4130 through the inlet 4130*a* varies.

According to an optional embodiment, the base unit 4130 may include an open area 4139, and specifically, the open area 4139 may be formed to be connected to the first accommodation unit 4131.

The placement, replacement, or repair of the support unit 4170 may be easily performed through the open area 4139.

According to an optional embodiment, referring to FIG. 28, a magnetic unit (not shown) may be disposed in the moving unit 4140, e.g., in the inner space. For example, the magnetic unit (not shown) may include a magnetic material, e.g., a permanent magnet.

The magnetic unit (not shown) may include a first area (e.g., an N pole or an S pole) and a second area (e.g., an S pole or an N pole) having different polarities, and the first area and the second area having different polarities may be arranged at one point of the rotation of the moving unit 4140 in a direction toward the expression unit 4110, e.g., the Z-axis direction.

According to an optional embodiment, when the moving unit 4140 is at the lowest point, a center axis of a magnetic unit (not shown) may not be coaxial with a center axis of the expression unit 4110 and may be misaligned. When the moving unit 4140 is driven by a magnetic field, a torque may be generated at the moving unit 4140, thereby facilitating a rotational movement or an angular movement of the moving unit 4140. The moving unit 4140 may include a movement control unit 4142.

A driving position of the moving unit 4140 may be controlled through the movement control unit 4142. For example, when the moving unit 4140 moves, the moving unit 4140 may move while the movement control unit 4142 is being disposed in the guide groove 4135.

According to an optional embodiment, the movement control unit 4142 may perform a movement similar to the shape of the guide groove 4135, e.g., the shape of the alphabet "U".

The movement control unit 4142 may have a protruding shape, and for example, the movement control unit 4142 may have a shape protruding from a side surface of the moving unit 4140, and the movement control unit 4142 may be disposed in the guide groove 4135.

Figure 29:
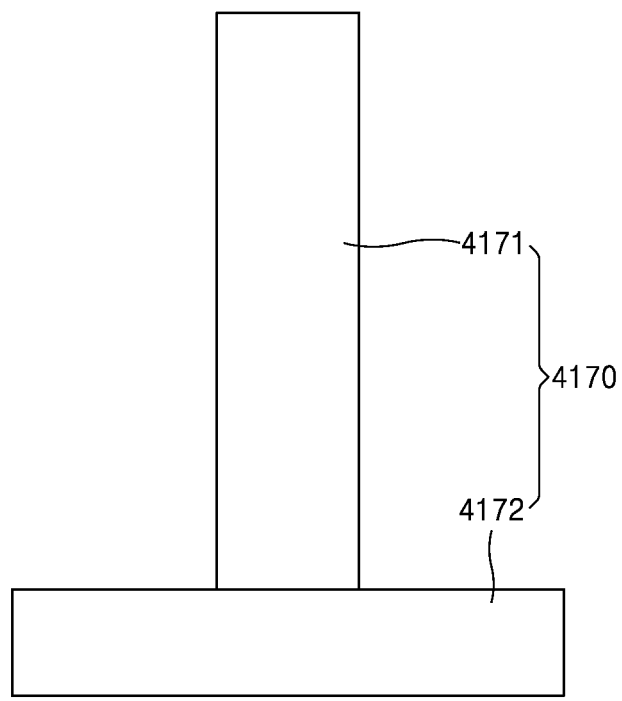
FIGS. 29 and 30 are diagrams for describing an optional embodiment of a support unit included in one unit included in the protruding-based smart tablet according to an embodiment of the present disclosure.
Figure 30:
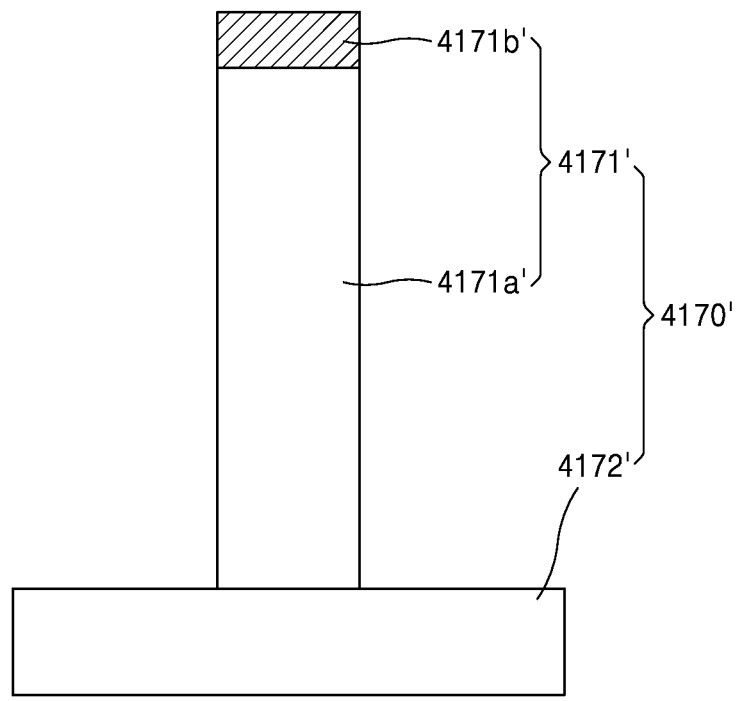

FIGS. 29 and 30 are diagrams for describing an optional embodiment of the support unit included in one unit included in the protruding-based smart tablet according to an embodiment of the present disclosure.

For example, FIGS. 29 and 30 may be drawings describing an optional embodiment of the support unit of FIG. 28.

Referring to FIG. 29, as described above, the support unit 4170 of the present embodiment may include the body member 4172, and the body member 4172 may be disposed to be connected to the extension member 4171 and to support the extension member 4171.

In addition, as a modified example, referring to FIG. 30, a support unit 4170' may include a body unit 4172', and the body unit 4172' may be disposed to be connected to an extension 4171'. In addition, an upper end member 4171*b*' may be formed at one end of the extension 4171', and the upper end member 4171*b*' may include a material different from that of a bottom member 4171*a*' of the extension 4171'.

According to an optional embodiment, the upper end member 4171*b*' may include a material, such as a plastic or a ceramic. For example, the bottom member 4171a' may include a magnetic material and the upper end member 4171b' may include a plastic.

Figure 31:
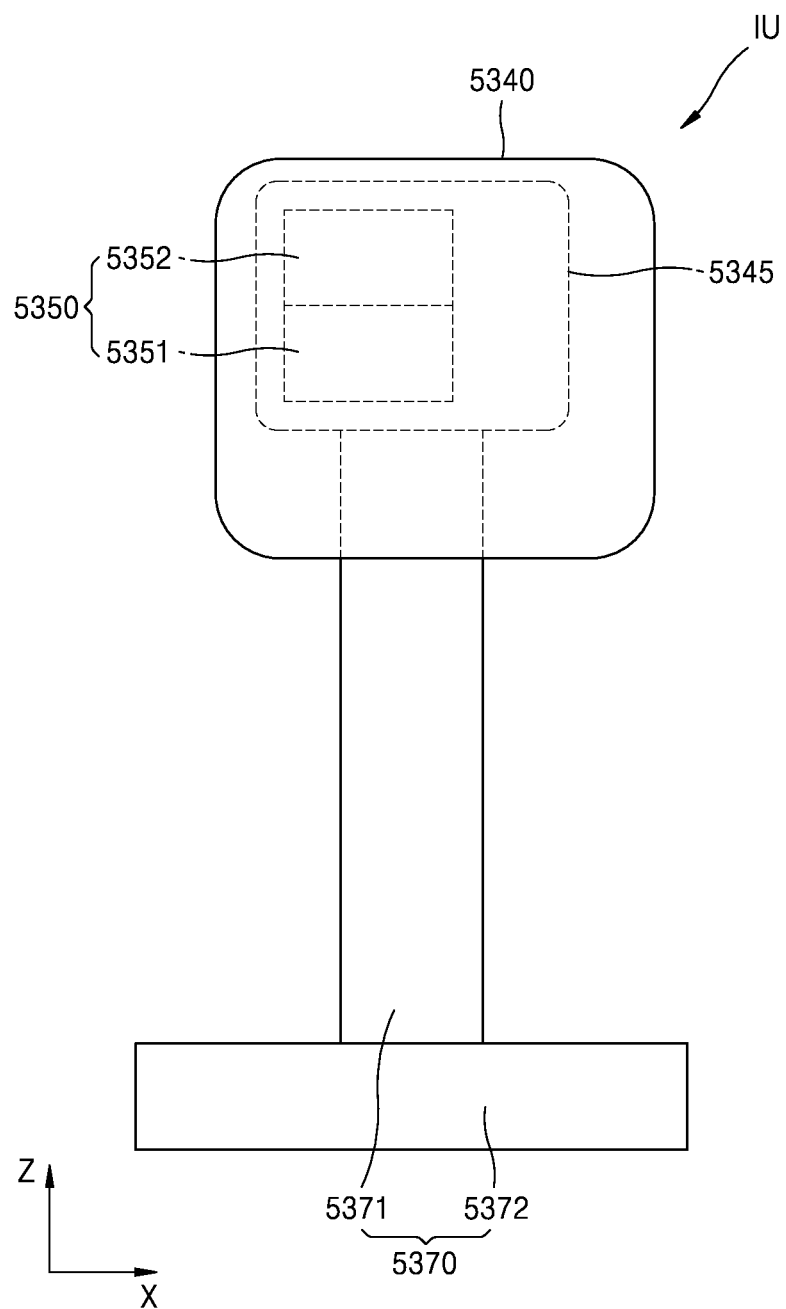
FIGS. 31 and 32 are diagrams for schematically describing another example of one unit included in the protruding-based smart tablet according to an embodiment of the present disclosure.
Figure 32:
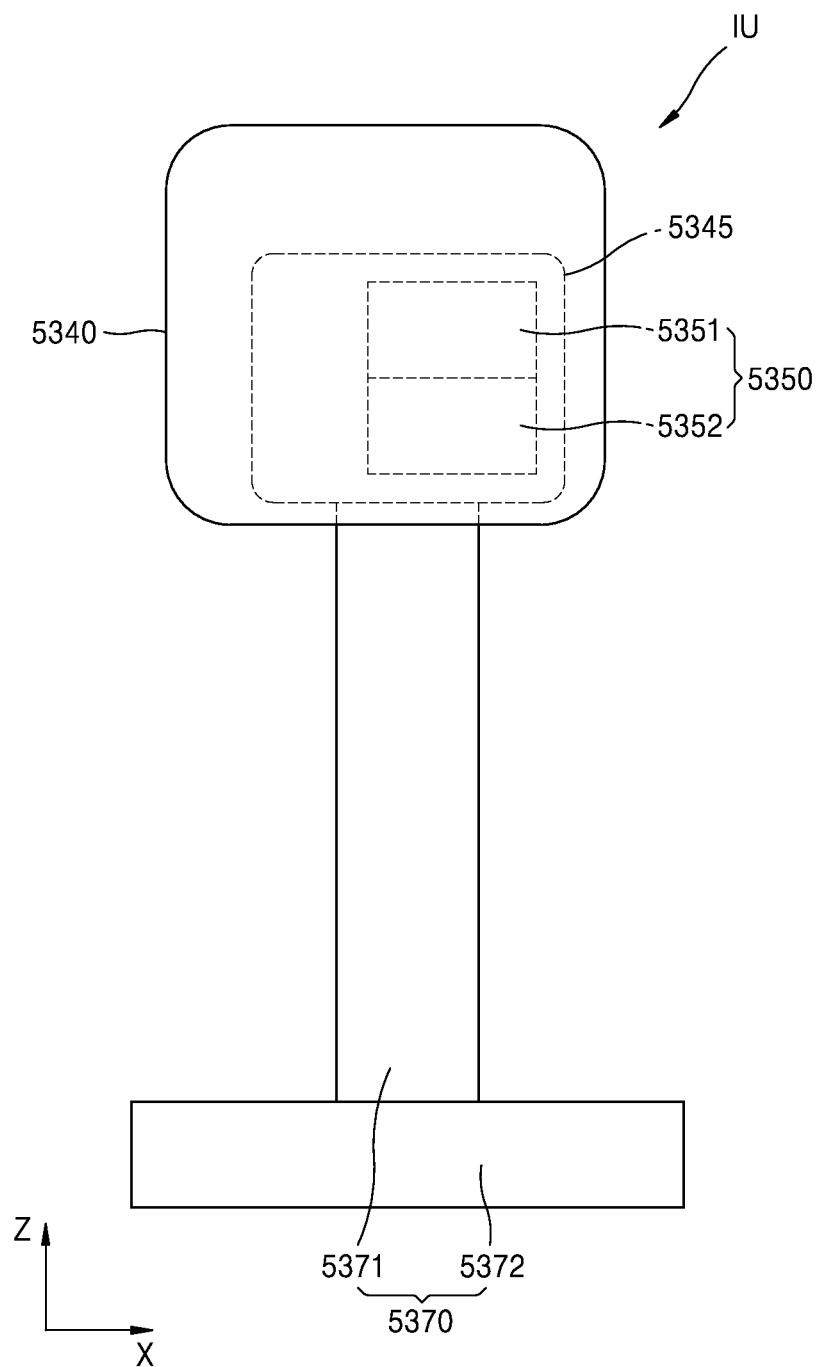

FIGS. 31 and 32 are diagrams for schematically describing another example of one unit included in the protruding-based smart tablet according to an embodiment of the present disclosure.

Referring to FIGS. 31 and 32, the unit IU of the present embodiment may include a base unit (not shown), a coil unit (not shown), a moving unit 5340, and an expression unit (not shown).

For convenience of description, differences from the above-described embodiments will be mainly described.

In addition, for convenience of description, the base unit and the expression unit are not shown in the drawings.

A support unit 5370 may include an extension member 5371, and the extension member 5371 may be connected to a body member 5372.

A magnetic unit 5350 may be disposed in an inner space of the moving unit 5340. For example, the magnetic unit 5350 may include a magnetic material, e.g., a permanent magnet.

The magnetic unit 5350 may include a first area 5351 (e.g., an N pole or an S pole) and a second area 5352 (e.g., an S pole or an N pole) having different polarities, and the first area 5351 and the second area 5352 having different polarities may be arranged at one point of the rotation of the moving unit 5340 in a direction toward an expression unit 5310, e.g., the Z-axis direction.

The moving unit 5340 may include two driving members facing each other and arranged to have a separation space therebetween. External surfaces of the two driving members of the moving unit 5340 may support the expression unit 5310 and provide a moving force to the expression unit 5310 during at least the movement of the moving unit 5340.

A moving proximity unit 5345 may be disposed between the two facing driving members of the moving unit 5340.

According to an optional embodiment, the moving proximity unit 5345 may be disposed at a position overlapping the magnetic unit 5350.

According to an optional embodiment, the moving proximity unit 5345 may overlap a center axis of the extension member 5371.

The moving proximity unit 5345 may move and be supported together with the moving unit 5340 when the moving unit 5340 performs a rotational movement or an angular movement. For example, the moving proximity unit 5345 may be supported by one end of the extension member 5371 of the support unit 5370. As another example, a base unit (not shown) may have a shape extending in a direction toward the extension member 5371, and the extending area may support the moving proximity unit 5345.

The moving proximity unit 5345 is formed to have a smaller width than the two driving members of the moving unit 5340, and a height of the moving unit 5340 may vary according to the angular or rotational movement of the moving proximity unit 5345.

For example, as compared to FIG. 31, FIG. 32 shows that the moving proximity unit 5345 is moved to rotate, for example, 180 degrees, and accordingly, the moving unit 5340 performed a rotational movement and an ascending movement.

Figure 33:
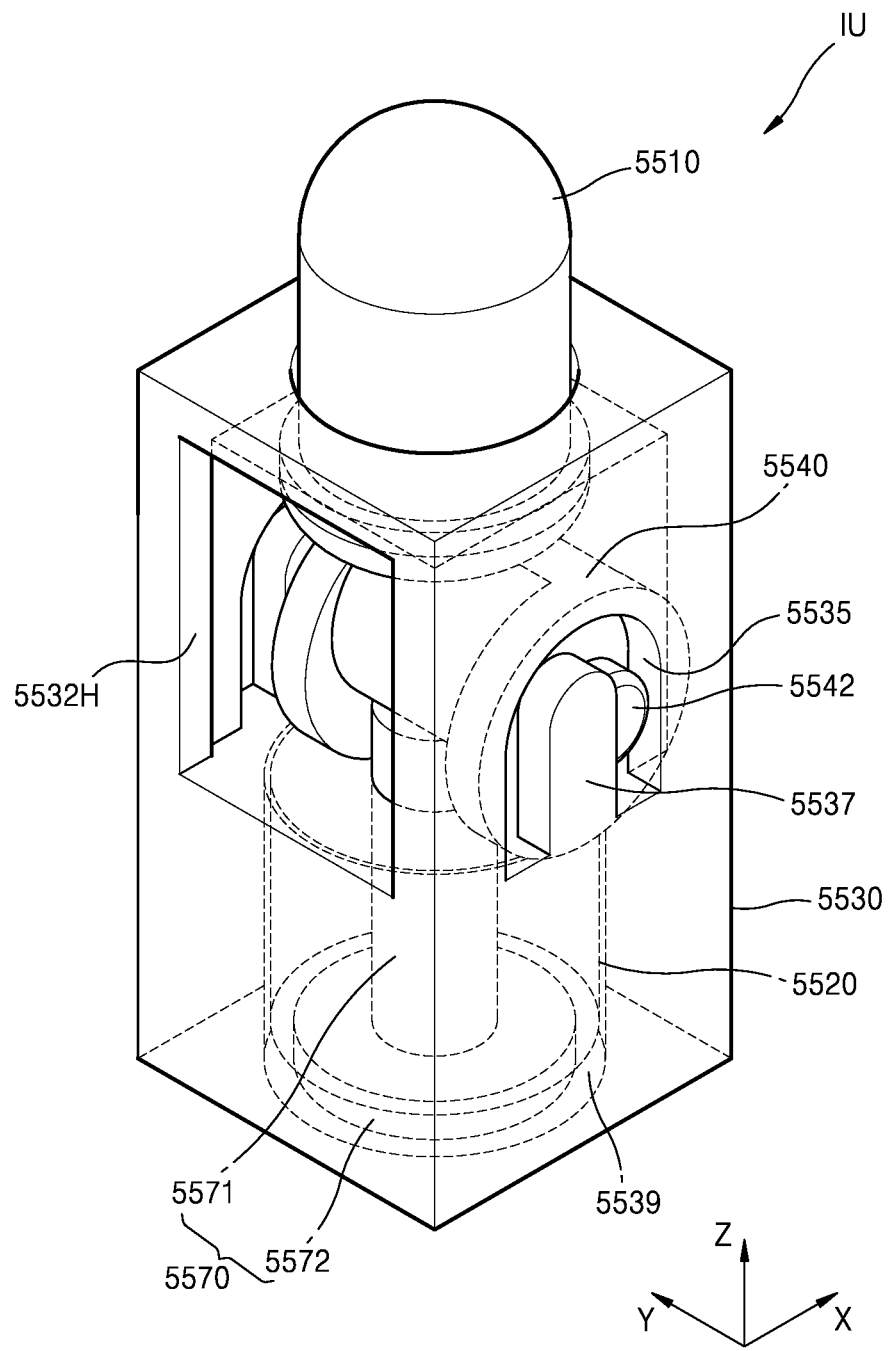
FIGS. 33 and 34 are diagrams for schematically describing another example of one unit included in the protruding-based smart tablet according to an embodiment of the present disclosure.
Figure 34:
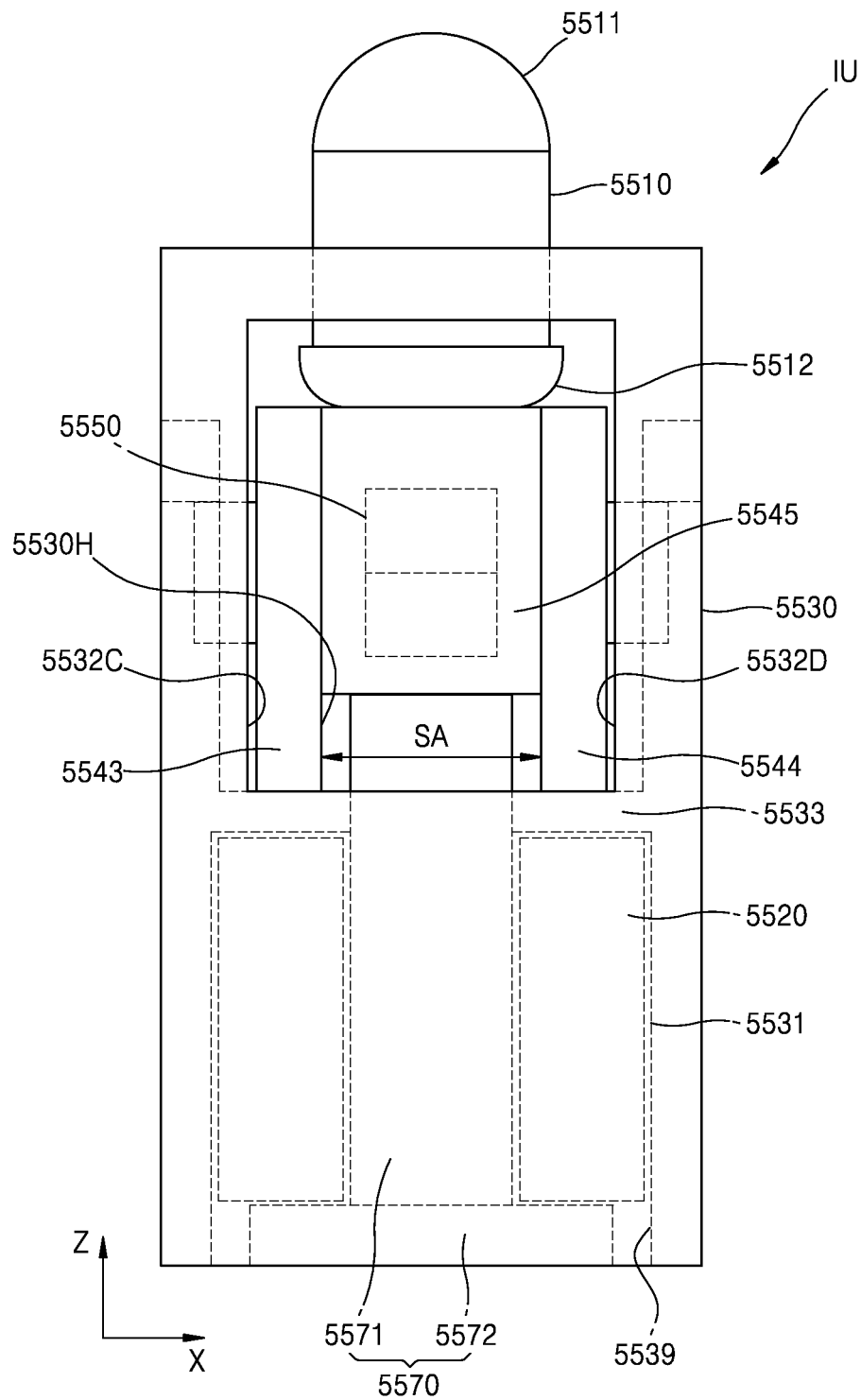

FIGS. 33 and 34 are diagrams for schematically describing another example of one unit included in the protruding-based smart tablet according to an embodiment of the present disclosure.

The unit IU of the present embodiment may include a base unit 5530, a moving unit 5540, an expression unit 5510, and a coil unit 5520.

The coil unit 5520 may be disposed in a first accommodation unit of the base unit 5530 and may have, for example, a shape wound around an extension member 5571 of a support unit 5570 with the extension member 5571 at the center.

By applying a current to the coil unit 5520, a magnetic field for the moving unit 5540 may be generated. For example, an attractive force or a repulsive force may be generated.

The base unit 5530 may include one or more guide grooves 5535.

The expression unit 5510 may move according to the movement of the moving unit 5540 and may positionally move upward and downward at least in a lengthwise direction of the expression unit 5510.

Accordingly, the expression unit 5510 may be moved to protrude in one direction, and a user may sense the movement of the expression unit 5510 tactilely or visually.

The expression unit 5510 may include an expression surface 5511 and a support surface 5512.

The support surface 5512 is a surface from among areas of the expression unit 5510 facing the moving unit 5540 and may constitute a lower area of the expression unit 5510 and may contact the moving unit 5540. The moving unit 5540 may transmit a force to the expression unit 5510 through the support surface 5512.

According to an optional embodiment, the support surface 5512 may include a curved surface, thereby implementing flexible driving force transmission through the moving unit 5540.

The expression surface 5511 is the outermost (e.g., the uppermost) surface from among the areas of the expression unit 5510 and may include an area to be recognized by a user.

For example, the entire area of the expression unit 5510 may be recognized by a user or only the expression surface 5511 may be recognized. For example, the user may sense the movement of the expression unit 5510 by coming into contact with the expression surface 5511, and the user may easily sense the movement of the expression unit 5510 through visual sensing of the expression surface 5511.

According to an optional embodiment, the expression surface 5511 may include a curved surface.

The expression unit 5510 may have various shapes. The expression unit 5510 may include a pillar-shaped area, and for example, the expression unit 5510 may include an area having a shape similar to that of a cylinder.

In addition, according to an optional embodiment, a protruding area of the expression unit 5510 may have a curved surface and may also have rounded corners.

According to an optional embodiment, the support unit 5570 may include a body member 5572, and an extension member 5571 may be connected to the body member 5572.

As a specific example, the extension member 5571 may have a shape elongated from the body member 5572 in a direction close to the expression unit 5510.

The base unit 5530 may include, for example, a first accommodation unit 5531, a second accommodation unit 5532, and the guide groove 5535.

The first accommodation unit 5531 and the second accommodation unit 5532 may be arranged adjacent to each other and may not overlap each other.

According to an optional embodiment, the first accommodation unit 5531 and the second accommodation unit 5532 may be spaced apart from each other.

According to another optional embodiment, the first accommodation unit 5531 and the second accommodation unit 5532 may be connected through a through hole 5530H.

According to an optional embodiment, the support unit 5570 may be disposed in the first accommodation unit 5531. According to an additional embodiment, one area of the support unit 5570, e.g., one area of the extension member 5571, may be elongated and disposed in the second accommodation unit 5532 through the through hole 5530H.

The guide groove 5535 may be formed in the second accommodation unit 5532. For example, the guide grooves 5535 may be formed on both inner side surfaces of the second accommodation unit 5532 of the base unit 5530 facing each other. According to another optional embodiment, the guide groove 5535 may be formed on only one inner side surface.

The guide groove 5535 may have a through-hole shape, and as another example, the guide groove 5535 may have a groove shape that is not exposed to the outside of the base unit 5530.

The base unit 5530 may have an elongated shape to accommodate the moving unit 5540 and may be formed to completely surround the moving unit 5540.

According to an optional embodiment, the base unit 5530 may include a boundary 5533 between the first accommodation unit 5531 and the second accommodation unit 5532.

The first accommodation unit 5531 and the second accommodation unit 5532 may be separated by the boundary 5533.

In addition, the base unit 5530 may include an inlet 5530a, and the inlet 5530a may be connected to the second accommodation unit 5532. The expression unit 5510 may move, such that a length of a portion thereof protruding out of the base unit 5530 through the inlet 5530a varies.

According to an optional embodiment, the base unit 5530 may include an open area 5539, and specifically, the open area 5539 may be formed to be connected to the first accommodation unit 5531.

The placement, replacement, or repair of the support unit 5570 may be easily performed through the open area 5539.

According to an optional embodiment, a window 5532H connected to one area of the second accommodation unit 5532 of the base unit 5530 may be formed. Even in a state in which the expression unit 5510 is not removed, the state of the second accommodation unit 5532, e.g., the state or driving of the moving unit 5540, may be checked or inspected through the window 5532H.

According to an additional embodiment, the width and the height of the window 5532H may be equal to or greater than the width and the height of the moving unit 5540 in at least one direction. Accordingly, when necessary, the moving unit 5540 may be easily discharged and put in through the window 5532H and may be easily replaced, repaired, and inspected.

The moving unit 5540 may be disposed in the base unit 5530. The moving unit 5540 may be disposed in the second accommodation unit 5532.

The moving unit 5540 may perform an angular movement or a rotational movement by a magnetic field generated through the coil unit 5520. The expression unit 5510 may be moved up and down by the moving unit 5540.

A magnetic unit 5550 may be disposed in an inner space of the moving unit 5540. For example, the magnetic unit 5550 may include a magnetic material, e.g., a permanent magnet.

The magnetic unit 5550 may include a first area (e.g., an N pole or an S pole) and a second area (e.g., an S pole or an N pole) having different polarities, and the first area and the second area having different polarities may be arranged at one point of the rotation of the moving unit 5540 in a direction toward the expression unit 5510, e.g., the Z-axis direction.

The moving unit 5540 may be formed such that at least an outer surface thereof supports the support surface 5512 of the expression unit 5510, thereby providing a moving force for the upward and downward movement of the expression unit 5510.

The moving unit 5540 may include a movement control unit 5542.

In addition, the present embodiment may include a moving proximity unit 5545 formed in one area of the moving unit 5540.

According to an optional embodiment, the moving proximity unit 5545 may be disposed at a position overlapping the magnetic unit 5550.

The moving unit 5540 may include a first driving member 5543 and a second driving member 5544 and may include a separation space SA therebetween.

The moving proximity unit 5545 may be disposed in the separation space SA between the first driving member 5543 and the second driving member 5544.

The second accommodation unit 5532 of the base unit 5530 may include a first groove 5532C and a second groove 5532D.

The first groove 5532C and the second groove 5532D may be elongated. The first driving member 5543 and the second driving member 5544 may be arranged to correspond to the first groove 5532C and the second groove 5532D, respectively. Accordingly, the moving unit 5540 may perform an angular movement, a rotational movement, or an upward and downward movement while the first driving member 5543 and the second driving member 5544 of the moving unit 5540 are being arranged to correspond to the first groove 5532C and the second groove 5532D. Accordingly, the moving unit 5540 may stably move, thereby facilitating precise movement control for the expression unit 5510.

According to an optional embodiment, a protruding area may be formed between the first groove 5532C and the second groove 5532D. For example, the through hole 5530H may be formed in the protruding area.

The extension member 5571 of the support unit 5570 may correspond to the through hole 5530H. At this time, the extension member 5571 may protrude through the through hole 5530H and protrude more than the protruding area, and, according to an optional embodiment, the extension member 5571 may not protrude more than the protruding area or may protrude to the same height as the protruding area.

The present disclosure has been described with reference to the examples illustrated in the drawings, but these are only examples. It will be understood by those skilled in the art that various modifications and equivalent other examples may be made. Therefore, the scope of the present disclosure is defined by the appended claims.

The implementations described herein are illustrative examples of the embodiments and are not intended to otherwise limit the scope of the embodiments in any way. For the sake of brevity, conventional electronics, control systems, software development and other functional aspects of the systems may not be described in detail. Further, the connecting lines or connectors shown in the drawings are intended to represent example functional relationships and/or physical or logical couplings between the various elements. It should be noted that many alternative or additional functional relationships, physical connections, or logical connections may be present in a practical device. In addition, no item or element is essential to the practice of the present disclosure unless the element is specifically described as "essential" or "critical".

The use of the terms "a" and "an" and "the" and similar referents in the context of describing the present disclosure (especially in the context of the following claims) are to be construed to cover both the singular and the plural. Further, recitation of ranges of values herein are merely intended to serve as a shorthand method of referring individually to each separate value falling within the range, unless otherwise indicated herein, and each separate value is incorporated into the specification as if it were individually recited herein. Finally, operations of all methods described herein can be performed in any suitable order unless otherwise indicated herein or otherwise clearly contradicted by context. The present disclosure is not limited to the described order of the operations. The use of any and all examples, or exemplary terms (e.g., "such as") provided herein, is intended merely to better illuminate the present disclosure and does not pose a limitation on the scope of the present disclosure unless otherwise claimed. Also, numerous modifications and adaptations will be readily apparent to one of ordinary skill in the art without departing from the spirit and scope of the present disclosure.

The protruding-based smart tablet according to an embodiment of the present disclosure may improve information expression ability through precise control of the expression unit.

In addition, the protruding-based smart tablet according to another embodiment can improve user convenience by easily detecting an input of the user and then generating output information.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A protruding-based smart tablet including an expression area sensed by a user, the protruding-based smart tablet comprising:
   a plurality of expression units formed to perform a protruding movement so that the user senses the protruding;
   a movement control unit configured to control the protruding movement of the plurality of expression units;
   an information control unit configured to control the movement control unit to transmit one or more pieces of information through the plurality of expression units;
   a sensing unit configured to sense an object on the expression area; and
   an operation control unit configured to control an operation of an expression unit according to a sensing result by the sensing unit,
   wherein the operation control unit includes an operation-stop control unit and an operation change control unit,
   when the sensing unit senses that a body of the user is located to correspond to one or more first expression units, which are included in an information area generated through the information control unit, among the plurality of expression units, the operation-stop control unit stops an operation of the one or more first expression units corresponding to the information area, and
   when the sensing unit senses that the body of the user is located to correspond to one or more second expression units, which are included in the information area generated through the information control unit, among the plurality of expression units, the operation change control unit changes a position of the information area and controls one or more expression units corresponding to the changed position of the information area to protrude.

2. The protruding-based smart tablet of claim 1, wherein the sensing unit includes a plurality of sensing members arranged to be spaced apart from each other.

3. The protruding-based smart tablet of claim 1, wherein the expression unit moves by a magnetic field.

4. A protruding-based smart tablet including an expression area sensed by a user, the protruding-based smart tablet comprising:
   a sensing unit configured to sense a user manipulation area on the expression area;
   an information generation control unit configured to generate expression information by identifying the user manipulation area sensed by the sensing unit;
   a movement control unit configured to control a moving force according to the expression information generated by the information generation control unit; and
   a plurality of expression units formed to perform a protruding movement by the moving force provided by the movement control unit so that the user senses the protruding, and configured to express the expression information,
   wherein by sensing the user manipulation area on the expression area, information corresponding to the user manipulation area is presented on the expression area as the expression information through the plurality of expression units.

5. The protruding-based smart tablet of claim 4, wherein the expression information includes a manipulation path of the user.

* * * * *